United States Patent [19]
MacLeod et al.

[11] Patent Number: 5,778,092
[45] Date of Patent: Jul. 7, 1998

[54] METHOD AND APPARATUS FOR COMPRESSING COLOR OR GRAY SCALE DOCUMENTS

[75] Inventors: Peter S. MacLeod, Oakland; Luc Vincent, Palo Alto; Xianing Zhu, San Jose, all of Calif.

[73] Assignee: Xerox Corporation, Stamford, Conn.

[21] Appl. No.: 770,391

[22] Filed: Dec. 20, 1996

[51] Int. Cl.[6] .................................................. H04N 1/64
[52] U.S. Cl. .................. 382/176; 382/284; 358/534; 358/456; 358/464
[58] Field of Search ................................ 358/534, 536, 358/540, 429, 450, 451, 455, 456, 459, 462, 464, 539; 382/176, 284, 291, 292, 298, 299; H04N 1/64

[56] References Cited

U.S. PATENT DOCUMENTS 5,615,281   3/1997   Yamaguchi ........................ 382/299
5,642,204   6/1997   Wang ................................. 358/455
5,701,365   12/1997  Harrington et al. ................ 382/298

*Primary Examiner*—Kim Yen Vu
*Attorney, Agent, or Firm*—Richard B. Domingo

[57] ABSTRACT

A technique for compressing a color or gray scale pixel map representing a document. The pixel map is decomposed into a three-plane representation, a reduced-resolution foreground plane, a reduced-resolution background plane, and a high-resolution binary selector plane. The foreground plane contains the color or gray scale information of foreground items such as text. The background plane contains the color or gray scale information for the "background" of the page and the continuous tone pictures that are contained on the page. The selector plane stores information for selecting from either the foreground plane or background plane during decompression. Each of the respective planes is compressed using a compression technique optimal for the corresponding data type. Also described is a method for decompressing documents compressed into the three plane representation at arbitrary resolutions.

20 Claims, 25 Drawing Sheets

TYPE   (x,y,w,h)
[ Page
  Text
  Line Art
  Continuous Tone
  Sandwich ]

- Child Pointer
- Sibling Pointer
- Mask Pointer
- Bitmap Pointer(s)*

METHOD AND APPARATUS FOR COMPRESSING COLOR OR GRAY SCALE DOCUMENTS

FIELD OF THE INVENTION

The present invention is related to the field of color image processing, and in particular to techniques for compressing the digital representation of a color document.

BACKGROUND OF THE INVENTION

Documents scanned at high resolutions require very large amounts of storage space. For example, an 8.5"×11"page scanned at 300 spots/inch takes about 8.5 million bytes for a gray-scale pixel map (8 bits/pixel), and over 25 million bytes for a full-color pixel map. "Lossless" compression methods such as Lempel-Ziv Welch (LZW) do not perform particularly well on scanned pixel maps. "Lossy" methods such as JPEG work fairly well on continuous-tone pixel maps, but do not work particularly well on the parts of the page containing text. To optimize compression, techniques which can recognize the type of data being compressed are needed.

Various approaches are used to compress scanned images. An example of image compression based on symbol matching is described in U.S. Pat. No. 5,303,313 entitled "Method and Apparatus For Compression Of Images", Mark et al., issued Apr. 12, 1994 (the '313 patent). In the '313 patent an image is "precompressed" prior to symbol matching. The '313 patent describes using run-length encoding for such precompression. Symbols are extracted from the run-length representation. A voting scheme is used in conjunction with a plurality of similarity tests to improve symbol matching accuracy. The '313 patent further discloses a template composition scheme wherein the template may be modified based on symbol matches. However, the symbol matching approach while good for text based documents, does not do well on continuous tone images.

Another approach is to segment a document into text and non-text portions and utilize different compression schemes on each.

In order to implement the very high levels of compression needed to build devices such as a color facsimile machine, new compression and related techniques are needed.

SUMMARY OF THE INVENTION

An improved technique for compressing scanned documents comprised of color or gray scale images is disclosed. The technique utilizes a format for digital color and gray-scale documents based on a three-plane representation; a reduced-resolution foreground plane, a reduced-resolution background plane, and a high-resolution binary selector plane. The foreground plane contains the color or gray scale information of foreground items such as text. The background plane contains the color or gray scale information for the "background" of the page and the continuous tone pictures that are contained on the page. The selector plane stores binary information for selecting a pixel value from either the foreground plane or background plane during decompression. Preferably, a logical one value will indicate selection from the foreground plane, while a logical zero value will indicate selection from the background plane. Each of the respective planes is then compressed using a compression technique optimal for the data contained in that plane. For example, the foreground and background planes may be compressed using a JPEG method while the selector plane is compressed using a symbol based compression technique.

The technique utilizes a method for decomposing the pixel map of raw scanned documents such that they can be stored in the three-plane format. The technique is generally comprised of the steps of: thresholding the pixel map representation of the scanned document to create a thresholded bitmap, computing the reduced resolution foreground map using the thresholded bitmap to find the color (or gray scale value) for connected components; computing the reduced resolution background map from the pixel map by generating a plurality of reduced resolution pixel maps which omit the small detail of the document image; and computing the bitmap for the selector plane by performing an adaptive thresholding technique suitable for finding text.

Also described is a method for decompressing documents compressed into the multi-plane format at arbitrary resolution for the purpose of display or printing.

BRIEF DESCRIPTION OF THE DRAWINGS

FIG. 5 is an illustration of a selector map for the selector plane of the original document shown in FIG. 2.

FIG. 11 is an illustration of bitmap thresholded "best for text" as created while performing the image segmentation for computing the background plane in the currently preferred embodiment of the present invention.

DETAILED DESCRIPTION OF THE INVENTION

Figure 1:
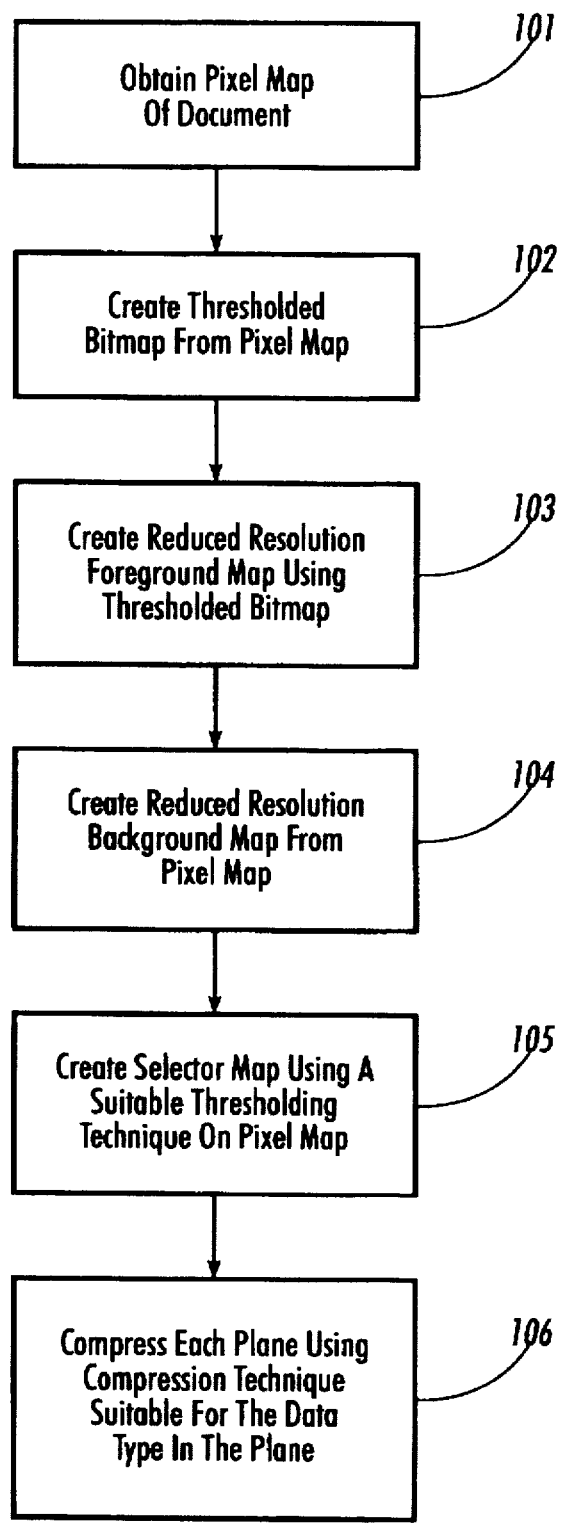
FIG. 1 is a flowchart illustrating the basic steps for compressing a color or gray scale document in the currently preferred embodiment of the present invention.

A technique for compressing scanned representations of color or gray scale documents is described. The technique if suitable for uses in various devices required to store or transmit color documents such as facsimile devices, image storage devices and the like. It should be noted in some details have been omitted, such as the compression technique used to compress a particular plane, in order not to obscure or detract from the present invention. In other instances, details have been disclosed which would have been apparent to one of skill in the art, such as a particular technique for thresholding a bit-mapped image, in order to more clearly describe the present invention.

In the description below, various portions are described with reference to color documents, but apply equally to gray scale documents. It should be noted that the examples and illustrations presented in the Figures are in gray scale, but the same concepts apply to color documents.

A pixel map is one in which each pixel represents some "value" which indicates the color or how light or dark (for gray scale documents) the image is at that point. Most pixel maps have values which are taken from a set of discrete, non-negative integers. For example, a typical gray-scale pixel map might have values ranging from 0, representing black, to 255, representing the whitest tone possible. The pixel maps of concern in the currently preferred embodiment are representations of "scanned" images, that is, images which are created by digitizing light reflected off of physical media using a digital scanner. The term bitmap is used to mean a binary pixel map in which pixels can take one of two values, 1 or 0.

In the currently preferred embodiment, the pixel map representing a color or gray-scale document is decomposed into a three plane page format. The document format is comprised of a "foreground" plane, a "background" plane, and a "selector" plane. The "foreground" and "background" planes are stored at the same bit depth and number of colors as the original raw pixel map, but usually at reduced resolution. The "selector" plane is created and stored as a bitmap. Each of the planes is comprised of a corresponding map which is compressed using a compression method suitable for the data contained in the plane. For example, the foreground and background planes may be compressed and stored using JPEG, while the selector plane may be compressed and stored using a symbol-based compression format. It would be apparent to one of skill in the art to compress and store the planes using other formats that are suitable for the intended use of the color document. For example, in the Color Facsimile arena, group 4 (MMR) would preferably used for the selector plane, since the particular compression format used must be one of the approved formats (MMR, MR, MH, JPEG, JBIG, etc.) for facsimile data transmission.

The "background" plane contains two things. First, it contains the color of the "background" of the page, including the color of tints, washes, etc. Second, it contains the continuous-tone pictures that are found on the page. In the currently preferred embodiment, the background plane has a resolution of 75 spots/inch.

The "foreground" or "ink" plane contains the "ink colors" of foreground items such as text. It is also stored at the reduced resolution of 75 spots/inch.

The "selector" plane is stored at higher resolution (e.g. 600 spots/inch for a 300 spots/inch original document). The purpose of the selector plane is to describe, for each pixel in the selector plane, whether to use the pixel value found in the background plane or the foreground plane. A "white" pixel in the selector plane (i.e. a logical zero value) means the pixel value should be taken from the corresponding (nearest-neighbor) pixel from the background plane. A "black" pixel in the selector plane (i.e. a logical one value) means that the pixel value should be taken from the corresponding (nearest-neighbor) pixel from the foreground plane.

Compression Method

Figure 2:
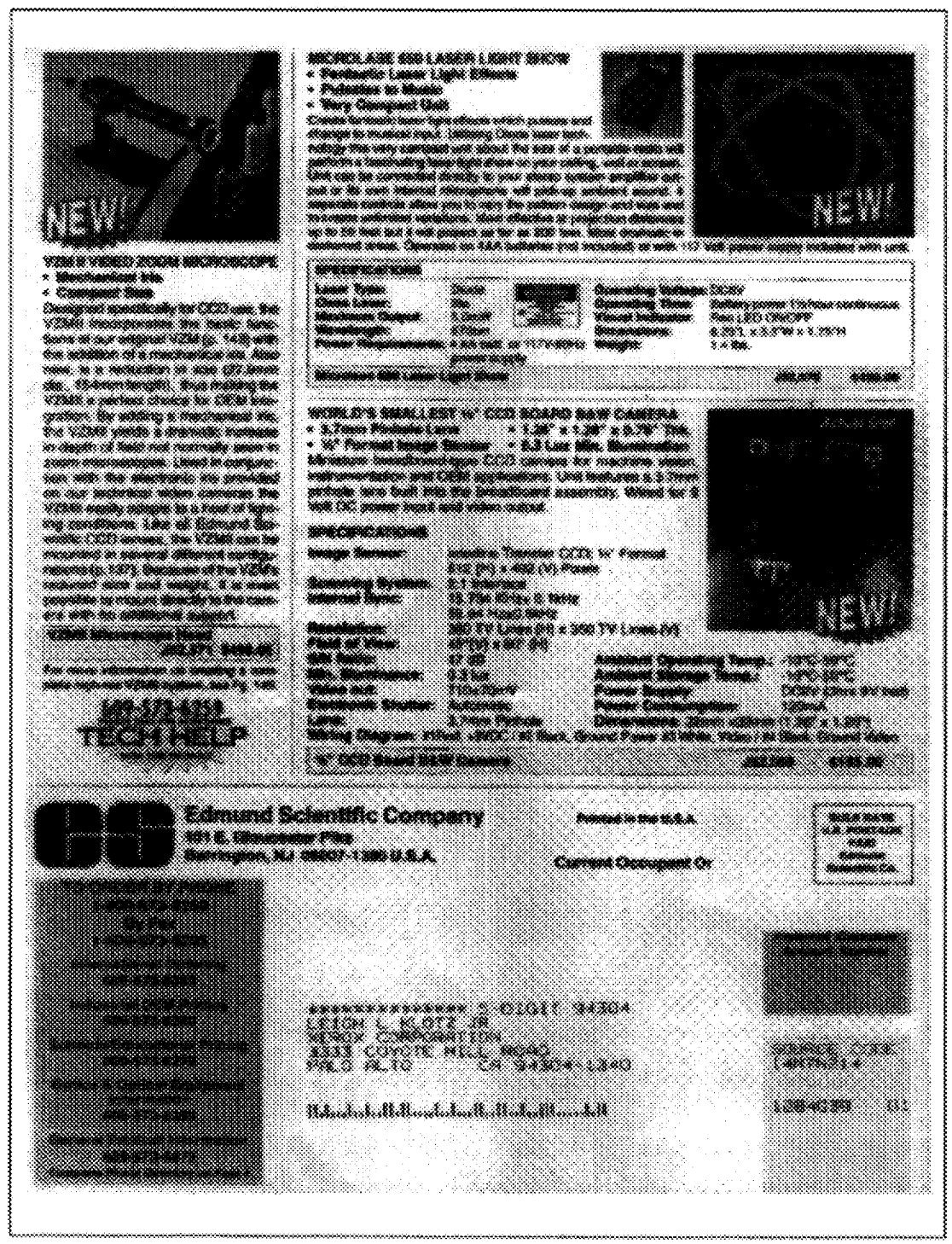
FIG. 2 is an illustration of an original document.
Figure 3:
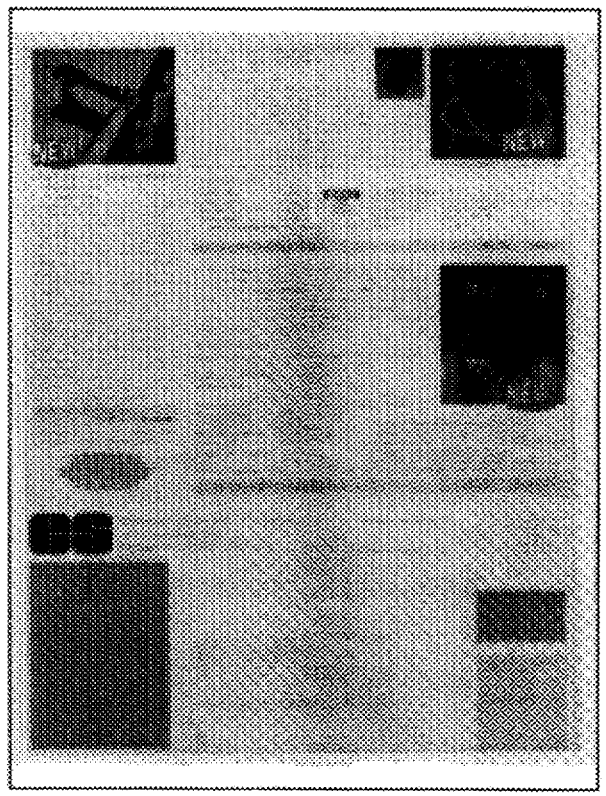
FIG. 3 is an illustration of a foreground map for the foreground plane of the original document shown in FIG. 2.

The basic steps for compressing a document of an embodiment of the present invention are illustrated in the flowchart of FIG. 1. The original document to be compressed (in gray scale) is illustrated in FIG. 2. Referring to FIG. 1, a pixel map representation of the document is obtained, step 101. This may be through scanning an original of the document, or by retrieving a stored pixel map representation of the document. The pixel map representation is then analyzed to generate the information for the three planes. The first step of the analysis is to create a thresholded bitmap from the original pixel map, step 102. Generally, the thresholding step creates a new bitmap containing binary values is formed based on an adaptively determined threshold value. The thresholded bitmap is desirable since it eliminates undesirable artifacts. Using the threshold bitmap, a reduced resolution foreground map containing color (or gray scale) information of foreground items, such as text is computed, step 103. A visual representation of a foreground map for the original document image of FIG. 2 is illustrated in FIG. 3.

Figure 4:
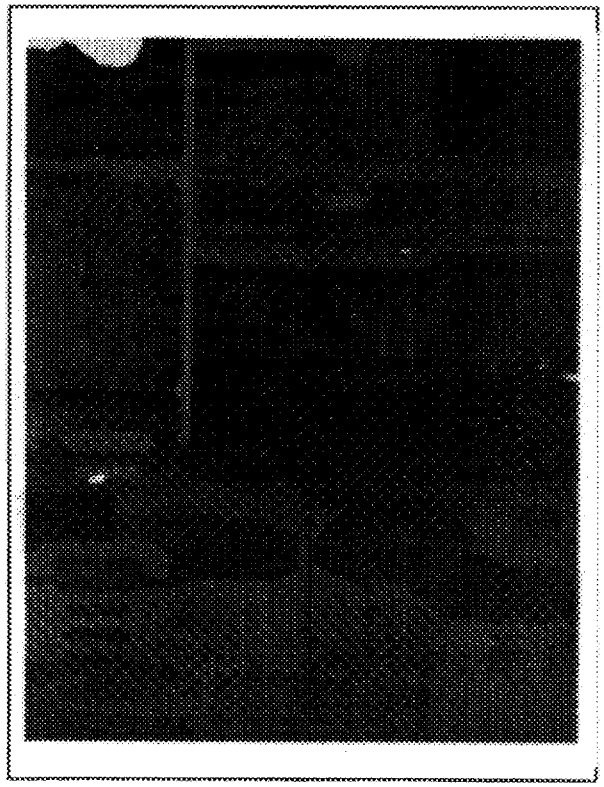
FIG. 4 is an illustration of a background map for the background plane of the original document shown in FIG. 2.

The reduced resolution background map is then computed, step 104. In this step, the "image" or non-text portions are identified by an image segmentation process (described in detail below). This information is used to create the reduced resolution background map which contains background color information as well as continuous tone image information. A visual representation of a background map for the original document image of FIG. 2 is illustrated in FIG. 4.

Figure 5:
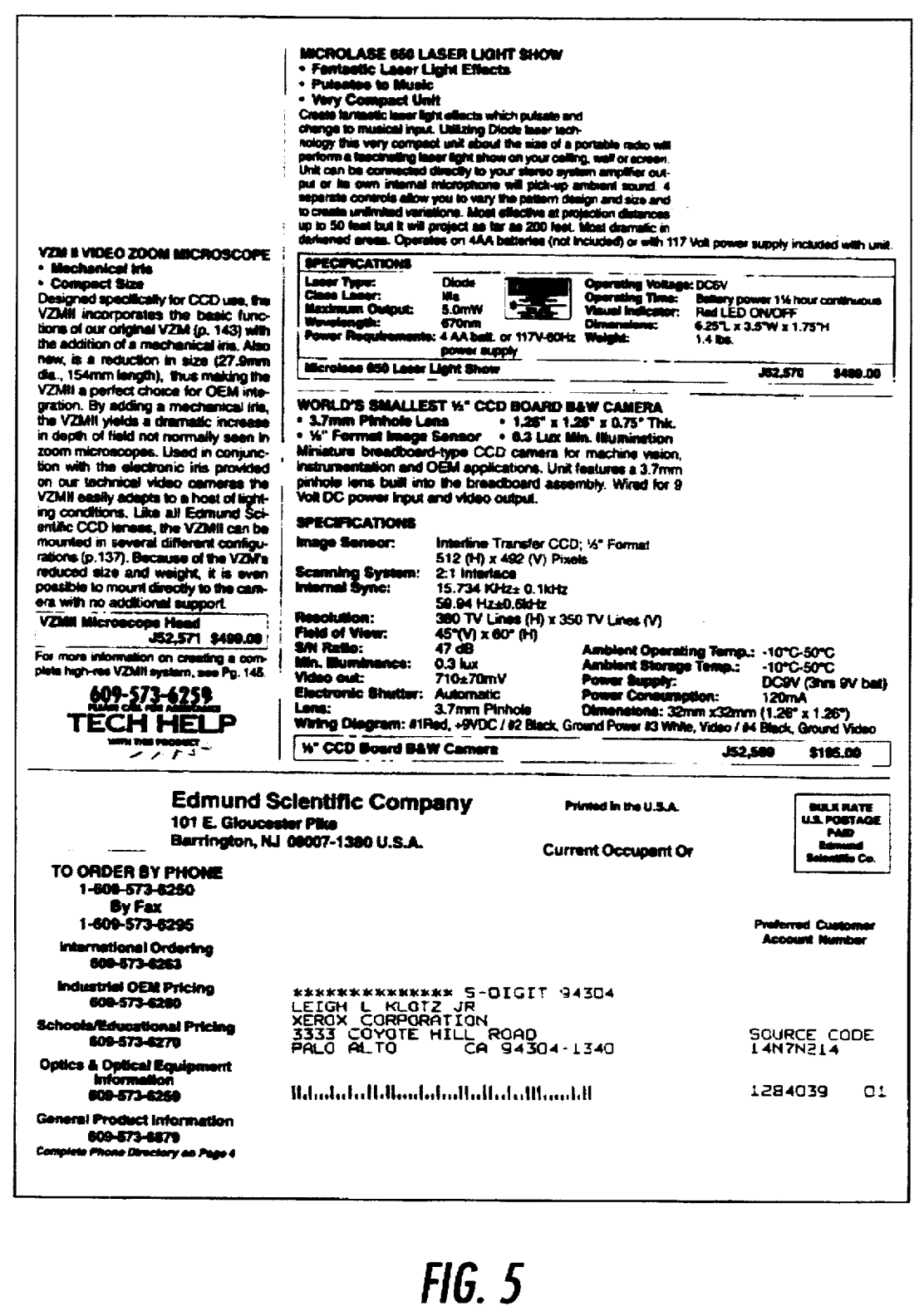

Next, the selector plane is computed, step 105. The selector plane is a bitmap computed using a suitable thresholding technique on the original pixel map. A visual representation of a selector plane for the original document image of FIG. 2 is illustrated in FIG. 5.

Once each of the respective planes is generated, they are each compressed using a suitable compression technique, step 106. In the currently preferred embodiment, the foreground and background planes are compressed using JPEG while the selector plane is compressed using a symbol based pattern matching technique described in co-pending and commonly assigned U.S. patent application Ser. No. 08/575, 305.

Thresholding The Pixel Map

Thresholding the pixel map is a process wherein a bitmap of binary values is generated (i.e. the thresholded bitmap). Generally, the thresholding of the bitmap is performed in order to minimize the effect of any undesirable artifacts resulting from the scanning of the original document (e.g. quantization errors). It has been determined that thresholding the pixel map prior to compression results in a better resulting image after decompression. The thresholding process of the currently preferred embodiment is adaptive and based on the pixel values in a local "neighborhood" of pixels. The thresholding technique is described with reference to the flowcharts of FIGS. 6a and 6b.

First, a morphological gradient pixel map (difference of a gray-scale dilation and a gray-scale erosion with a 3×3 solid structuring element) is computed, step 601. The gradient pixel map is then thresholded at some constant which depends on resolution (it has been determined that 64 in the case of 300 spot/inch documents works well), step 602. A threshold map is then generated based on the connected components in the thresholded gradient pixel map, step 603. The connected components provide "likely" sites for finding thresholds. Creation of the threshold map is described in greater detail with respect to FIG. 6b. In any event, the computed threshold map is used, sampled in a nearest-neighbor fashion, to threshold the pixel map for the document, resulting in the thresholded bitmap, step 604.

Figure 6A:
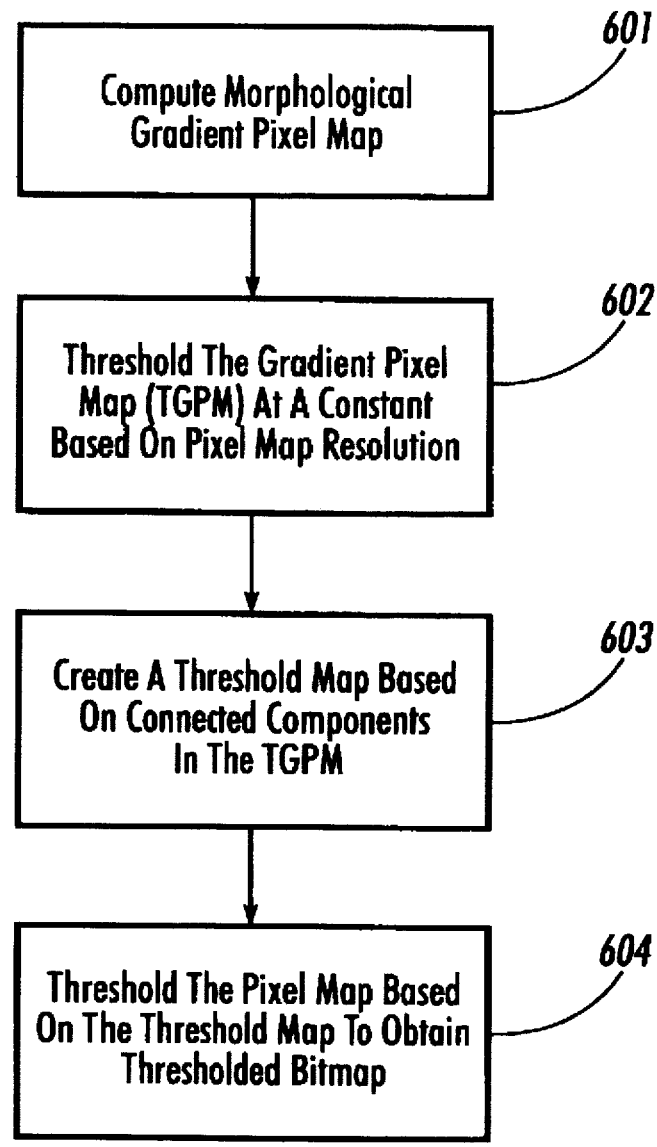
FIGS. 6a and 6b are flowcharts illustrating the steps for thresholding a bitmap as may be performed in the currently preferred embodiment of the present invention.
Figure 6B:
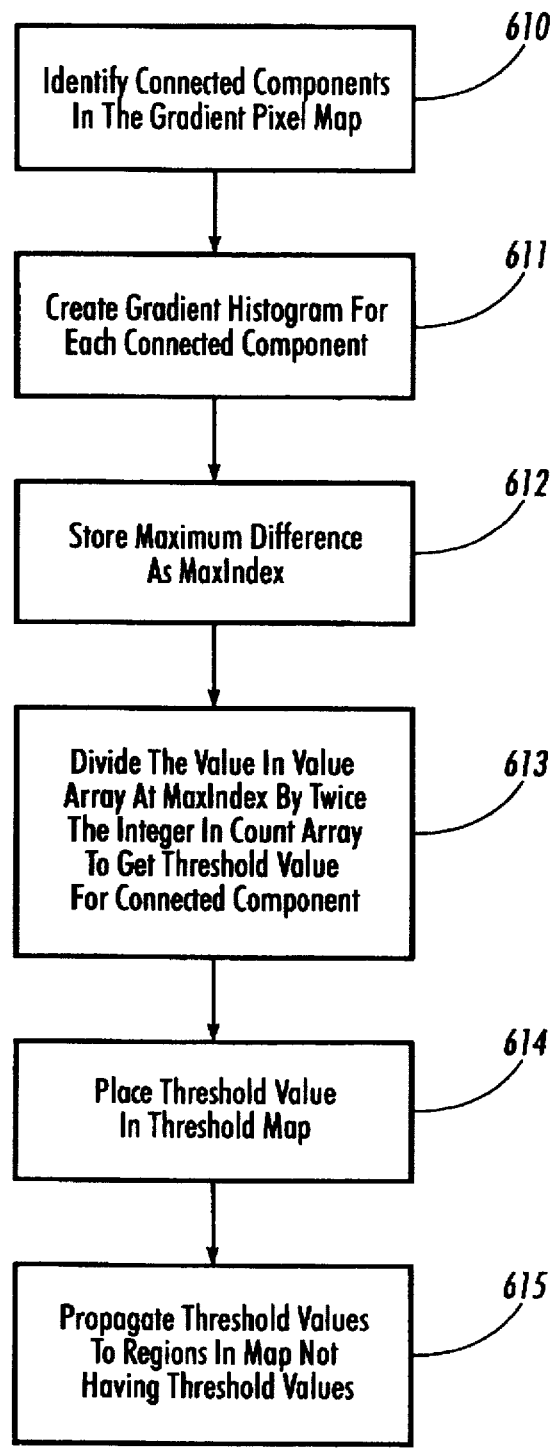
Figure 7:
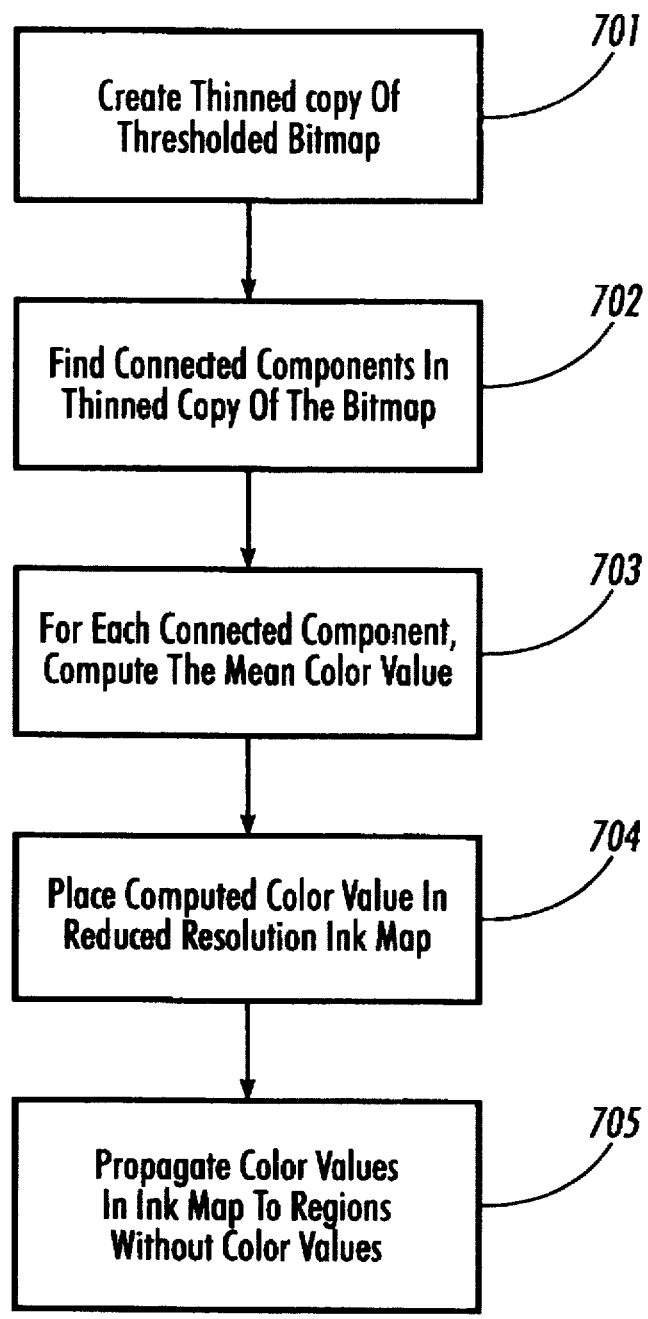
FIG. 7 is a flowchart illustrating the steps for computing the foreground plane map as may be performed in the currently preferred embodiment of the present invention.
Figure 8:
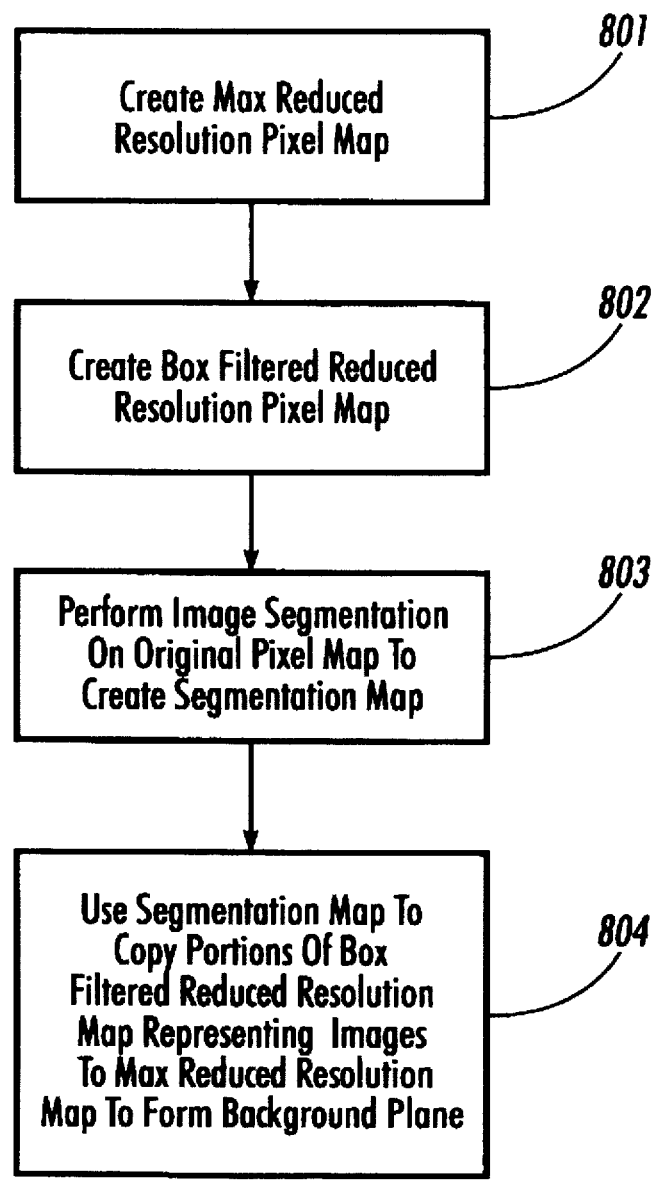
FIG. 8 is a flowchart illustrating the steps for computing the background plane map as may be performed in the currently preferred embodiment of the present invention.

Referring now to FIG. 6b, connected components in the thresholded gradient pixel map are identified, step 610. For each connected component, a gradient histogram is computed, step 611. The gradient histogram consists of two one-dimensional arrays of integers, the first called a "count" array and the second a "value" array. Both arrays are indexed by the same value. The elements of both arrays are initialized to zero. The index into the array is the absolute value of differences between adjacent pixels in the image. In the currently preferred embodiment, adjacent means all pairs of pixels in the 8-connected neighborhood, i.e. 4 pairs of pixels:

```
1 2 3
4 5 6
7 8 9
```

5→6, 5→9, 5→8, and 5→7, where pixel 5 is the one being considered. The other directions are assumed to have been covered by the histogramming of previous pixels. In any event, the histogram is created by examining each pair of adjacent pixels in a bounding box defining a connected component and computing the difference in intensity between these two pixels. If the difference is non-zero, the absolute values of this difference becomes an index into the arrays. The integer in the "count" array at the index values is incremented by one. The intensity of both pixel values is added to the "value" array at the index. When all the adjacent pixels are examined, the threshold for the connected component based on the histogram is determined as follows.

During the processing of steps 610 and 611 a running maximum difference (and associated table index value) is saved as "maxIndex", step 612. The index of this integer will be the largest absolute-value-of-difference found in the connected component. The integer in the "count" array at "maxIndex" represents the number of adjacent pixels which differed in intensity by "maxIndex". The integer in the "value" array at "maxIndex" will be the sum of all pixels which were part of the largest difference. Divide the value in the "value" array at maxIndex by twice the integer in the "count" array to get an average value of all of the intensities which contributed to the maxIndex difference, step 613. This average value becomes the threshold value. Since both endpoints of each difference were added, this value then approximates the "true" intensity of the edge at the maximum difference. The maximal difference is selected as the threshold since the pixels were examined with a horizontal orientation, and because text tends to have at least some vertical edges, the maximum difference found will most likely lie orthogonally to a vertical edge, since this will be the shortest-distance edge and therefore the steepest gradient.

Once a threshold value is determined, it is placed at the corresponding pixel in a reduced-resolution pixel map called the "threshold map", step 614. The thresholds are then propagated out to the regions (e.g. regions not associated with a connected component) in the threshold map which did not contain thresholds, step 615. Preferably, a known iterative First In First Out (FIFO) based procedure may be used. The result is that the regions around the computed thresholds are filled according to which threshold is closest in a geodesic (shortest path along the 4-connected grid) sense, i.e. the Voronoi region using a geodesic distance measurement, i.e. distance along the 8-connected grid, rather than euclidean distance.

In the currently preferred embodiment, the original pixel map may optionally be linearly interpolated up to twice its original resolution, and then thresholded. It has been determined that this results in better-formed text characters but at the expense of some compression.

Computing the Foreground Plane Map

The foreground Plane map is created using the thresholded bitmap. First, a thinned copy of the thresholded bitmap is created, step 701. The goal of such thinning is to obtain a mean of pixels in the middle of text characters and not the edges (which are subject to error). The thinning is accomplished by an erosion and subtraction process wherein existing edge pixels are removed. Connected components are then identified in the thinned copy of the thresholded bitmap, step 702. For each connected component in this thinned bitmap, the mean color or gray-tone value is computed, step 703. In the currently preferred embodiment, the mean color (or gray-scale) value is computed using the corresponding pixels in the original pixel map for each pixel in the connected component. This provides an "ink" color for the connected component. The ink color is placed in a reduced-resolution "ink map" that will ultimately become the foreground plane map, step 704. Using the same method as described with respect to creating the thresholded bitmap, the ink values are propagated using a two-pass sequential algorithm to fill out the empty values with computed ink colors, step 705. The two-pass sequential algorithm is a modification of a sequential distance transform described in "Mathematical Morphology in Image Processing", E. Dougherty, editor, Marcel-Dekker, 1992 in a chapter entitled "Morphological Algorithms" authored by Luc Vincent. The basic idea is to do a downward pass where the up and left neighbors are examined, and an upward pass where the down and right neighbors are examined. In the downward pass, the pixel value is examined. If the pixel is non-zero, nothing is done. If the pixel is zero, the two neighbors are examined, and the non-zero neighbor with the lowest distance value is selected and that value is filled into the current pixel. The current distance for the pixel is filled with the corresponding neighbor's distance plus one. Note that the distance value for a pixel corresponds to the distance to an original, i.e. before pixel value propagation, non-zero pixel.

In the upward pass, a similar approach is taken, but the distance for the current pixel is examined as well. The non-zero pixel with the minimum distance (current one and its two neighbors, the neighbor's distances having been incremented) is selected and set the current pixel's value to the minimum-distance pixel's value. The current distance is also updated if necessary.

Further note that in the currently preferred embodiment, the reduced-resolution map is 70 spots per inch.

Computing the Background Plane Map

The "background" plane map is created by reducing the resolution of the s original pixel map. A "max" reduced resolution pixel map is created by reducing the resolution by ½ in either dimension using averaging ("box" filtered) and then reducing by ½ in each dimension once again using "max" reduction ("max" filtered), that is, each reduced pixel equals the maximum of the four corresponding input pixels, step 801. A "box filtered" reduced resolution pixel map is created by performing a box filter operation on the result of the first box filter created in step 801, step 802. The result is two reduced-resolution pixel maps, one with a max-reduction, and one with a box-filter reduction on the second halving. If the original pixel map was 300 spots/inch, for example, the resulting pixel maps would be 75 spots/inch. Note that the reduction is based on the resolution of the original pixel map. The max-reduction tends to limit the darkness of small objects on the page; this effect is increased by performing a gray-scale dilation on the max-reduction pixel map, using a 3×3 solid structuring element. The result is an image which has all small features deleted. The max-reduction reduced resolution pixel map further contains tints while the box filter reduced resolution pixel map contains the images.

It should be noted that the difference between a box-filtered reduced image and a max-filtered reduced image is that the box-filtered reduced image has the pictures looking good but still has the text intact, but the max-filtered reduced image has some of the texture smeared off of the pictures, which also reduces the texture in the text.

As described below, an image segmentation is performed on the original pixel map to create a segmentation map to distinguish between foreground (text) and background (continuous tone and color) portions of the page, step 803. The map has a 1 in pixels corresponding to a "continuous tone image" part of the original pixel map, and a 0 everywhere else.

The segmentation map is then used to copy the contents of the pictures in the box-filtered reduced resolution pixel map into the dilated reduction pixel map, thus preserving the continuous-tone pictures in the background, step 804. The max-reduction reduced resolution pixel map then becomes the background plane. The box-filtered pixel map is then discarded.

Computing the Selector Plane

Computation of the Selector Plane is performed by using a suitable thresholding technique on the original pixel map for finding text. What results is a bitmap where pixels have a 1 value where they represent text and a 0 elsewhere. In the currently preferred embodiment, the thresholding technique described with reference to FIGS. 6a–6b is used to create the selector plane.

Text/Image Segmentation For Computing The Background Plane

It has been determined that known techniques for text/image segmentation did not provide adequate results for creating the background plane. The text/image segmentation problem as it applies to the computation of the background plane can be stated as follows: given a gray-scale pixel map of a page, produce a bitmap with the same dimensions as the pixel map representing the page, which contains a "1" mark where the corresponding pixel in the page's pixel map is part of an "image", such as a photograph, and a "0" mark where the corresponding pixel in the page's pixel map is not part of an "image".

The segmenter of the currently preferred embodiment described here has several advantages over known earlier work. First, it uses grayscale information rather than purely binary values to improve segmentation accuracy. Second, it employs several heuristic techniques for improving the resulting segmentation, including identifying text-on-tint, and identifying near-rectangular objects.

The particular invention is a significant extension to methods which segments binary (values 1 or zero) pixel maps. The extension takes as its input a gray-tone pixel map instead of a binary pixel map (bitmap), which can result in significantly higher quality segmentation, especially in the presence of certain artifacts which result from the scanning process, such as bleed-through from the back of the page, etc.

The basic technique involves the steps of:

1. Reduction
2. Threshold best-for-text
3. Compute text mask
4. Threshold best-for-images
5. Create best-for-text and best-for-images mask images
6. Find white horizontal and vertical gutters in best-for-text pixel mask
7. Remove gutters that are not touching orthogonal gutters
8. Cut masks in best-for-image mask using gutters found
9. Cut text out of resulting mask
10. Apply geodesic reconstruction to best-for-image mask
11. Plug holes 12. Detect almost-rectangular mask regions and make them rectangular.

Figure 9:
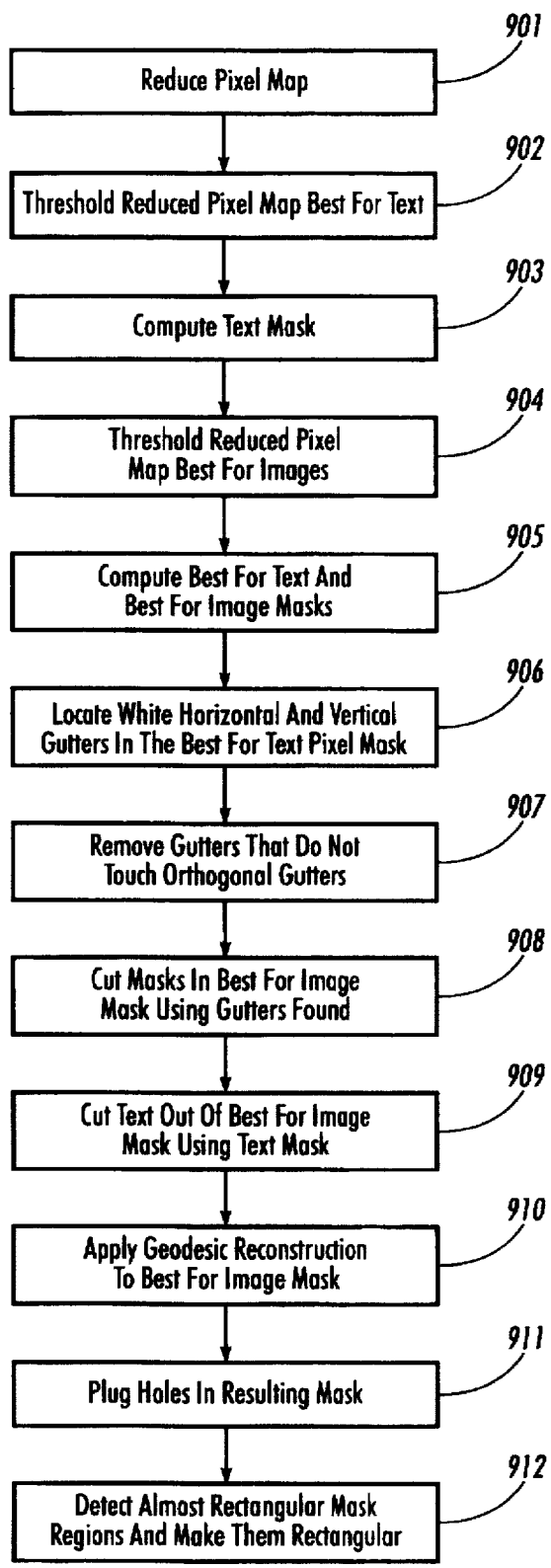
FIG. 9 is a flowchart illustrating the steps for computing the selector plane as may be performed in the currently preferred embodiment of the present invention.
Figure 10:
FIG. 10 is an illustration of an original document to which the steps of FIG. 9 are to be applied.

These steps are described in greater detail with reference to the flowchart of FIG. 9. It is assumed that the input to the technique is a pixel map representing a scanned document, and that the pixel map is either grayscale or color. An original document image to which the steps are to be applied is illustrated in FIG. 10. Referring back to FIG. 9, a reduction of the pixel map is first performed, step 901. Typically, the pixel map that is to be segmented is stored at 300 spots/inch (in each dimension), though some applications make two scanning passes, a low-resolution pass and a high-resolution pass, in which case the pixel map that is to be segmented is stored at 100 spots/inch. In any case, we attempt to produce a pixel map at approximately 100 spots/inch. If the pixel map input is 100 spots/inch, that value is used, otherwise an averaging ("box" filter) decimator is used to produce an image at approximately 100 spots/inch.

Referring back to FIG. 9, a threshold best-for-text on the reduced pixel map is performed, step 902. This "thresholding" produces a bitmap in which each pixel of the bitmap is either one or zero depending on whether the corresponding pixel in the gray-scale image is greater-than or equal to a "threshold" value, or below a "threshold" value. In the "best-for-text" thresholding, a threshold value is computed based on a global statistic of character connectivity. In the currently preferred embodiment, a histogram of run-lengths by threshold between 0 and 255 is computed and the optimal threshold is derived from that histogram. The slowly-varying areas of the extracted histogram correspond to candidate correct threshold points. To extract the best threshold value, the original histogram is smoothed and the absolute value of its derivative is computed. The potential thresholds are in the "widest areas of minimal absolute derivative". Processing is therefore run, that associates with each "pixel" of the histogram a value corresponding to how wide an area of low value there is around this pixel in the absolute derivative of the original histogram. Call this the grayscale granulometry function (ggran). The absolute derivative histogram is inverted before running the 'ggran' function.

The threshold corresponding to the highest value of the resulting ggran histogram is a good threshold to pick. To refine the technique even more, it has been observed that there are often wide areas where the ggran histogram is pretty much constant. In such cases, what is done is to look at the actual number of connected components, the assumption being that in these relatively constant areas, the best threshold is probably the one giving the maximal number of connected components. A normalized sum of the original smoothed histogram, and the smoothed ggran histogram is computed. The latter weighs much more than the former. Normalization is done according to the integral of each of these histograms.

The index corresponding to the maximal value of the resulting weighted sum of histograms is the threshold value extracted.

Figure 11:
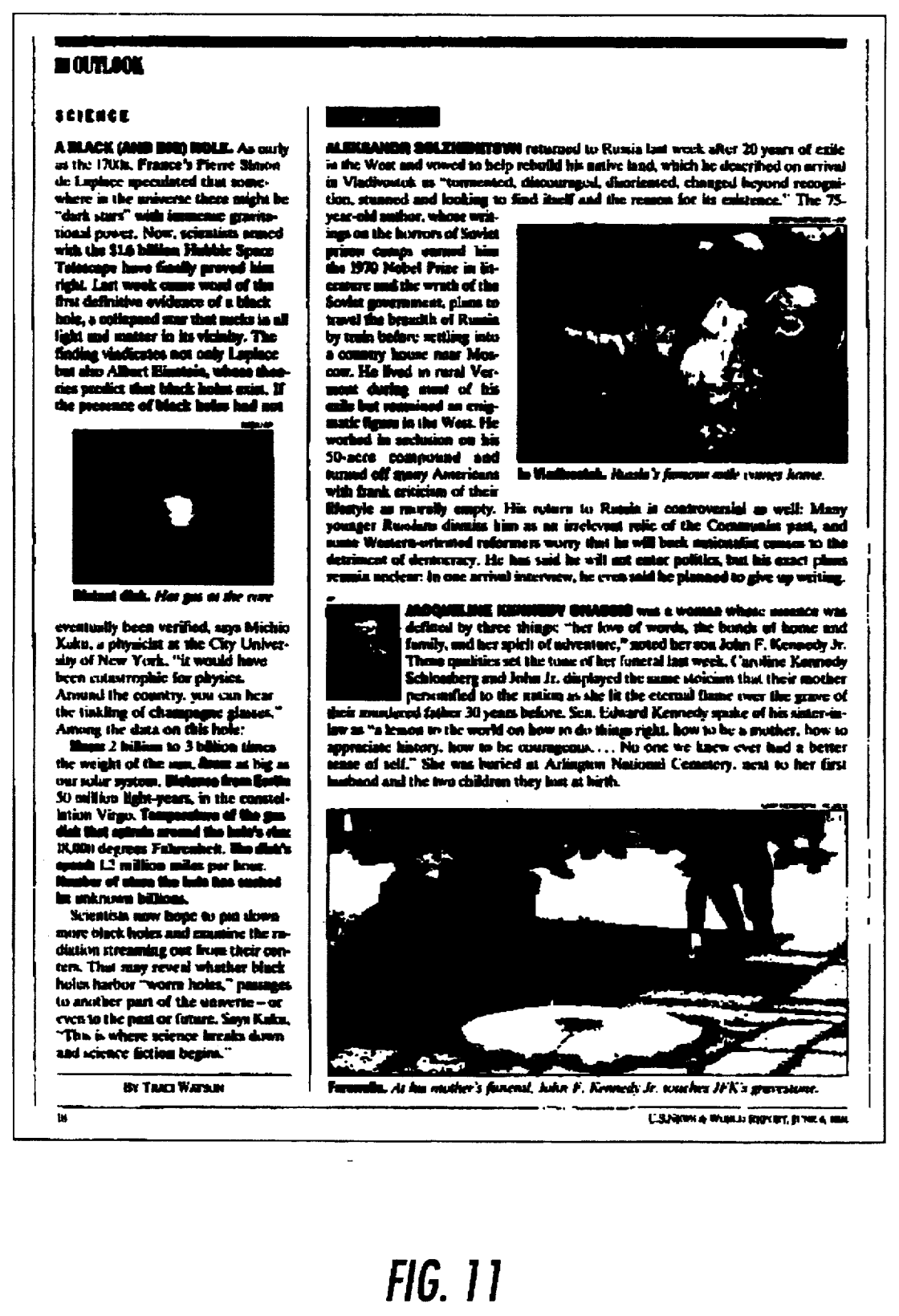

The goal of the "best-for-text" thresholding is to create a binary pixel map in which the text, represented as black, is well-formed, but not so dark that characters start touching excessively. A positive consequence of this thresholding is that "bleed-through" from the back of the page, a common problem in documents printed on very thin paper such as cheap magazines, is generally suppressed in this thresholding. On the minus side, the images in the page tend to be broken up and light. FIG. 11 shows a representation of the sample image of FIG. 10 reduced and thresholded best-for-text.

Referring back to FIG. 9, a text mask is computed, step 903. Using a text segmentation technique wherein regions in the reduced pixel map are identified that are almost certainly text characters, based on their adjacency relationships, and using a feature size computed from each individual text region by histogramming, small images are filtered out and large title characters are retained that would otherwise be misclassified. Generally, the steps of this text segmentation technique are:

a. find the set of connected components on the page, and their bounding boxes
b. compute a histogram of box heights.
c. using this histogram, compute some clusters of box heights.
d. filter out the connected components which are long and thin, i.e. horizontal and vertical bars.
e. filter out connected components which are very large, assuming that they are images.
f. iteratively merge horizontally adjacent boxes which are about the same size.
g. get rid of very small boxes.
h. get rid of boxes which were contained inside large image boxes.
i. get rid of isolated boxes and noise.
j. make a bitmap, and draw all of the remaining boxes as solid black inside their bounding boxes.

Figure 12:
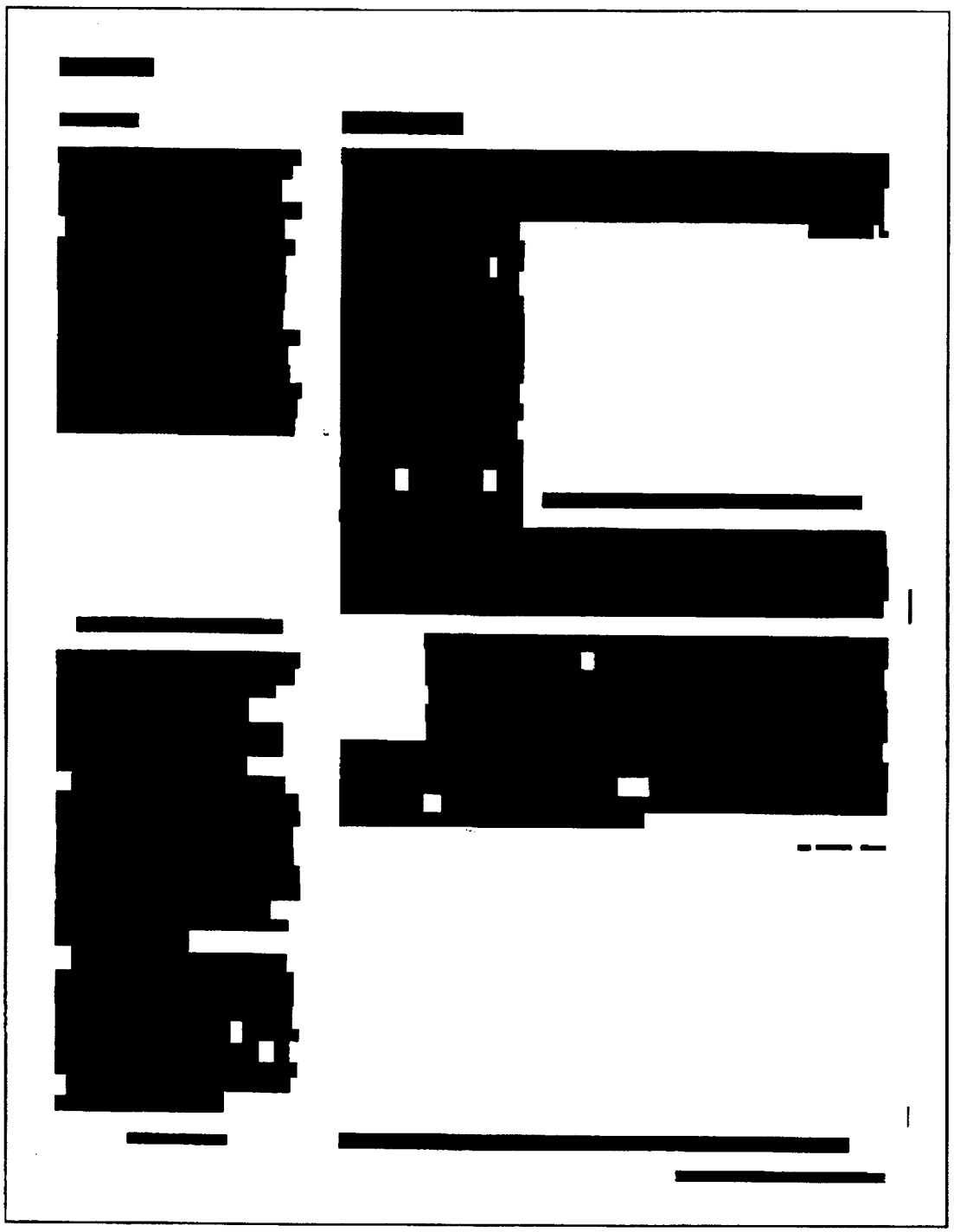
FIG. 12 is an illustration of a text mask as created while performing the image segmentation for computing the background plane in the currently preferred embodiment of the present invention.

After finding all of the text, "reverse video" text is detected, that is, areas where the background is black and the text is white, based on the black and white run length distribution. Reverse-video region candidates are found and the pixel values therein inverted. The text-finding algorithm is applied to the inverted candidate areas to validate that the region in question is indeed a text region. If this test passes, the inverse-video region is added to the text mask. The text mask is computed as another bitmap. FIG. 12 shows the text mask for the sample image of FIG. 10.

Referring back to FIG. 9, a second thresholding is performed on the reduced pixel map, resulting in the "best-for-images" bitmap, step 904. The threshold value is computed using a process which examines the histogram of gray values in non-text pixels located near text characters. The goal of this is threshold value is to separate the images and text from the page background. It is possible for the process to allow bleed-through from the back of the page to show up as black if present at a level darker than the background level, but it has no effect on the final result. The general idea of the process is to compute a histogram of pixels "close to" text, which is presumably background. The steps are as follows:

a. set a constant threshold value to one half the maximum allowed pixel value
b. make a thresholded version using the constant threshold value. This is a "guess" image. This means write a black pixel if a given gray pixel in the input image is between the threshold and the maximum value, i.e. the higher the threshold, the lighter the resulting image.
c. Make a reduced version, going down to not more than 25 spots per inch, using cascaded "thresholded" reductions, i.e. for each reduction of one half in each direction, the resulting pixel is computed from the four corresponding input pixels by counting the number of black pixels, which is 0, 1, 2, or 3. A threshold of "1" means that 1 can be on to allow a black pixel, a threshold of "2" means that 2 or more must be on, a threshold of 3 means that 3 or 4 must be on, and a threshold of 4 means that all 4 pixels must be on. The net result is that a low threshold tends to make things black and connected, and a high threshold makes things light and disconnected in the resulting reduced image. If a reduction of 16 is performed, then 4 thresholds would be needed, for each of the four reductions needed to go to ½, ¼, ⅛ and ⅙. In the currently preferred embodiment, no matter how many reductions are performed, a threshold of 1 is used for all reductions but the final one, and a threshold of 2 for the final reduction.

d. Perform a binary opening with 9-long horizontal and vertical structuring elements, to get rid of most of the text (long, thin things)
e. XOR that with the non-opened version, to get a text mask.
f. close that with a 4×4 square structuring element to fill in small gaps
g. dilate with a 5×5 square structuring element to get more of the background. If the resulting mask is less than 10% black, reduce the constant threshold by 1/16th (1+the maximum pixel value). If this value is not less than ⅓ the maximum pixel value, then go back to step b using this reduced value and try again.
i. Scale the mask back up to the resolution of the input image, and compute a "masked histogram", which means only histogram gray values which have a "1" in the corresponding binary pixel in the mask image.
j. The histogram will have some "gaps" due to missing codes. These are filled in using linear interpolation.
k. Compute a smoothed (numerical) first derivative of the gap-filled histogram.
l. Find the highest point on the histogram.
m. March backward from the highest point down the histogram, until the first derivative is greater than or equal to zero (i.e. flat or upward sloping).
n. compute the point of maximum slope along the upward sloping region by marching backward down the first derivative curve until a derivative ←=0 is found, keeping track of the maximum derivative value. This value is used to compute a "slope cutoff" value, which is ¼ the maximum derivative.
o. If the highest point along the histogram is ¼ of the maximum pixel value or less, consider the search to have failed, and use a nominal value of ½ the maximum pixel value, and exit.
p. otherwise, search backwards from the highest index again until the values are going downhill, i.e. the derivative is >0 (the curve slopes upward).
q. search backwards until either the derivative is less than the slope cutoff and the previous two points are also less than the slope cutoff.
r. The point where the slope cutoff is found is used as the background threshold value.

Figure 13:
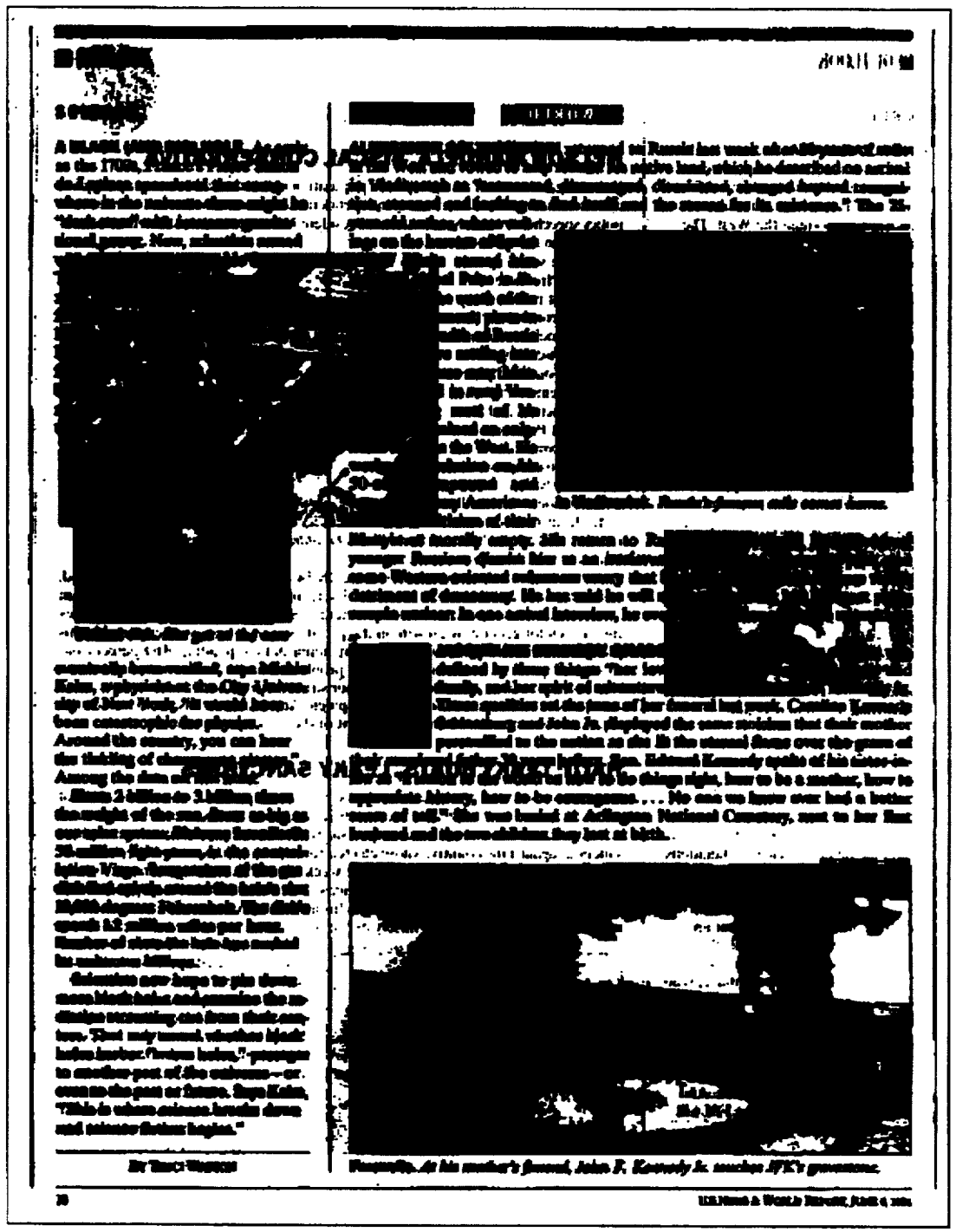
FIG. 13 is an illustration of a bitmap thresholded "best for images" as created while performing the image segmentation for computing the background plane in the currently preferred embodiment of the present invention.

FIG. 13 illustrates for the best-for-images thresholding bitmap for the sample document of FIG. 10.

Figure 14:
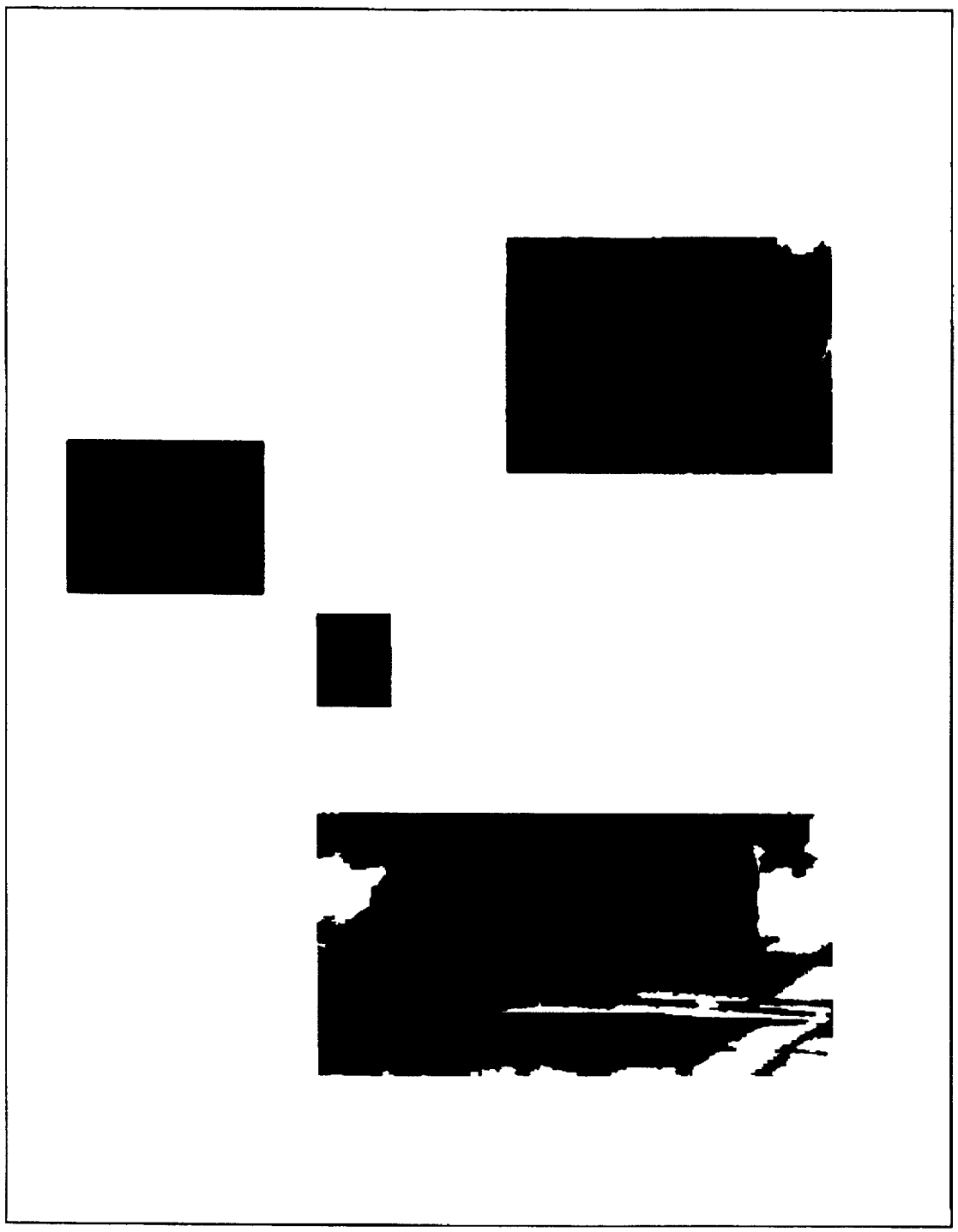
FIG. 14 is an illustration of a mask from best for text image as created while performing the image segmentation for computing the background plane in the currently preferred embodiment of the present invention.
Figure 15:
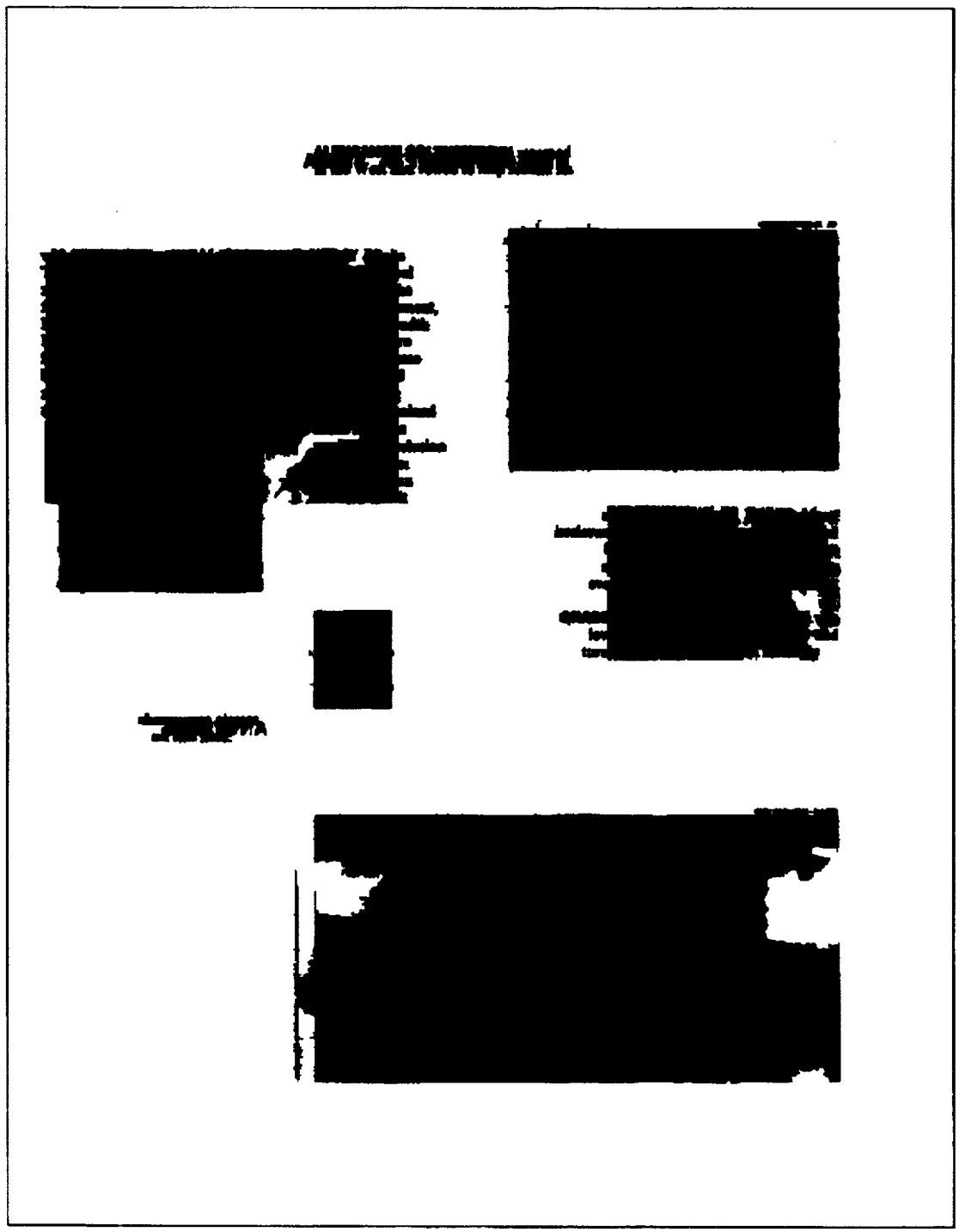
FIG. 15 is an illustration of a mask from best for pictures image as created while performing the image segmentation for computing the background plane in the currently preferred embodiment of the present invention.

Referring back to FIG. 9, best-for-text and best-for-images mask images are computed based on the best for text and best for image bitmaps, step 905. In the currently preferred embodiment, the techniques described in commonly assigned U.S. Pat. Nos. 5,065,437, 5,131,049, and 5,202,933, incorporated herein by reference, are utilized. Generally, the technique coalesces the "image" portions of a binary pixel map, and removes the "text-like" portions, and uses a reduced seed/mask reconstruction method to end up with a "mask" in which the images are preserved but the text is removed. The connected components of the images have interior holes filled. This algorithm is applied to both the "best-Express for-text" bit map and the "best-for-image" bit map. FIGS. 14 and 15 illustrate the segmentation resulting in the best-for-text and best-for-images mask images.

Figure 16:
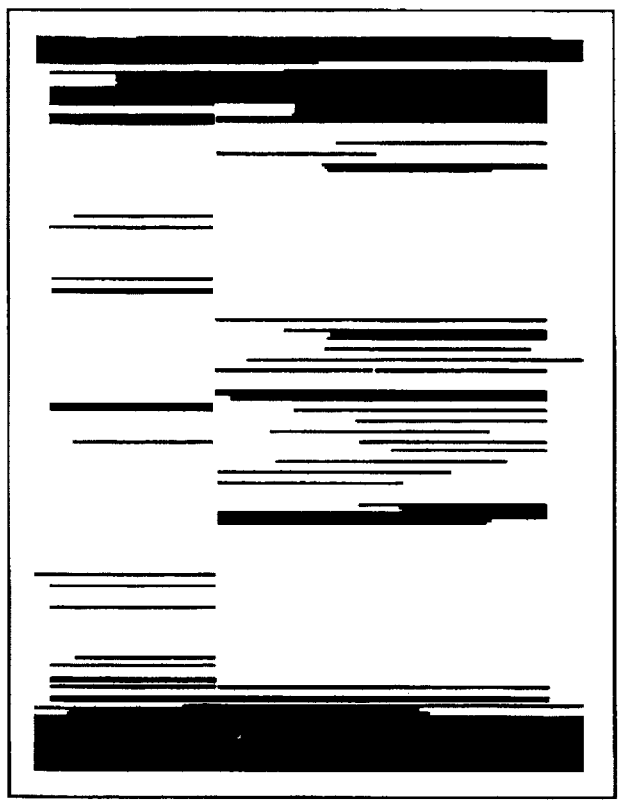
FIG. 16 is an illustration of a bitmap showing horizontal gutters as created while performing the image segmentation for computing the background plane in the currently preferred embodiment of the present invention.
Figure 17:
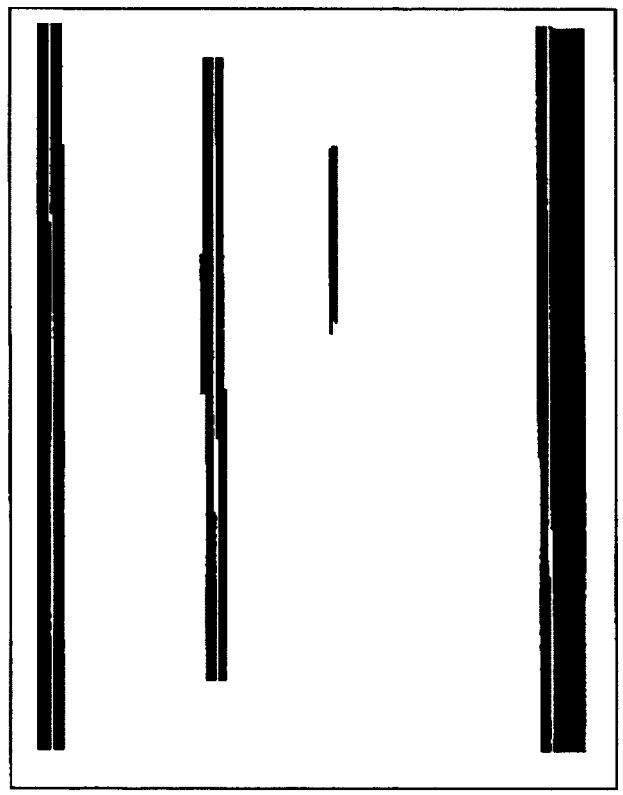
FIG. 17 is an illustration of a bitmap showing vertical gutters as created while performing the image segmentation for computing the background plane in the currently preferred embodiment of the present invention.

Referring back to FIG. 9, white horizontal and vertical gutters in the best-for-text pixel mask are located, step 906. The horizontal and vertical gutters identify areas where there are neither text or image information. The best-for-text mask is inverted and then two morphological openings (erosion followed by dilation) are performed, resulting in two bitmaps, one with long horizontal segments preserved and one with long vertical segments preserved. These correspond to long, continuous horizontal and vertical portions of white space in the original page. FIGS. 16 and 17 illustrate the horizontal and vertical gutter maps found in the sample document of FIG. 10.

Figure 18:
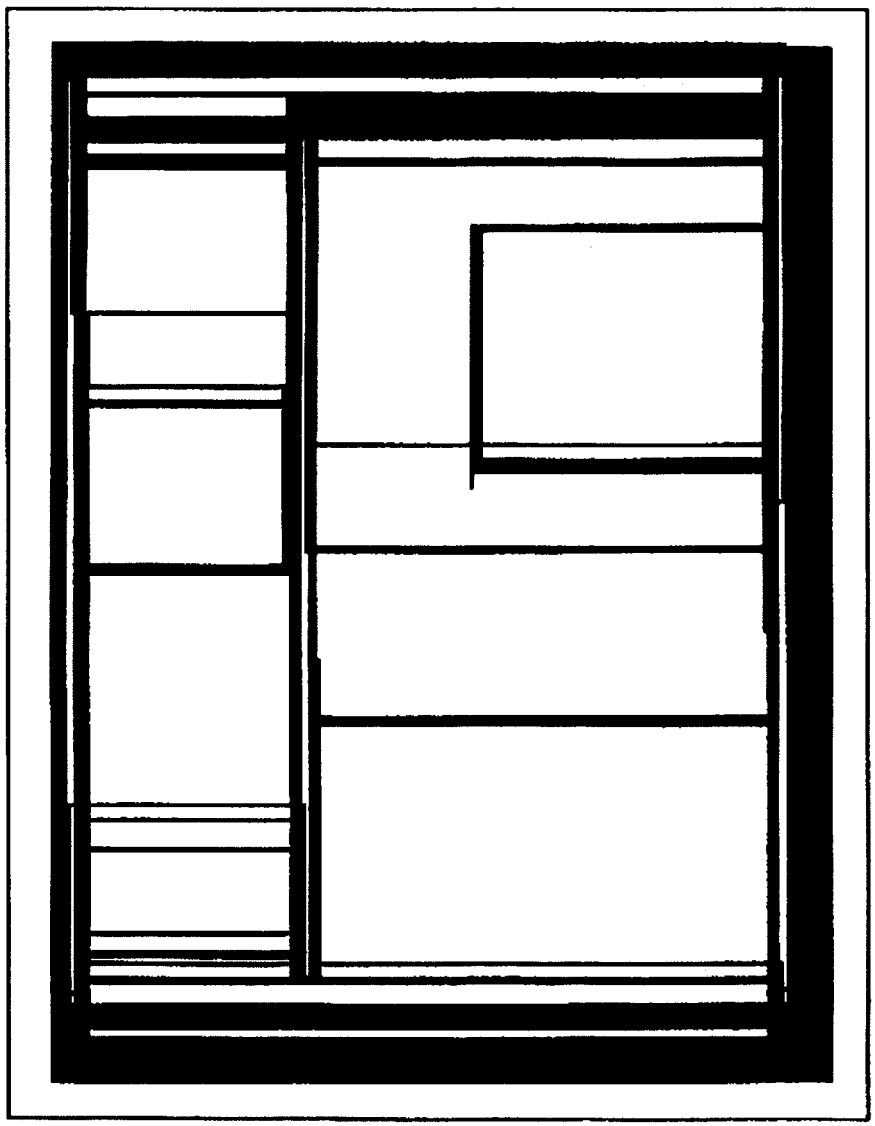
FIG. 18 is an illustration of a bitmap showing the resulting gutters after removal of those not orthogonal to a vertical gutter as created while performing the image segmentation for computing the background plane in the currently preferred embodiment of the present invention.

Referring back to FIG. 9, gutters that are not touching orthogonal gutters are removed, step 907. The following filtering process is applied to the horizontal and vertical gutter bitmaps. Two one-dimensional directional seed fills (reconstructions) into the horizontal bitmap are performed, a left-directed fill and a right-directed fill, using the vertical bitmap as a seed, and take the intersection of the two results. The result of the intersection is all horizontal line segments or sub-segments that were touching vertical segments at their endpoints. The opposite operation is performed, filling up and down in the verticals using the horizontals as a seed, and take the intersection of the two directions. The union of these two intersections results in all line segments whose endpoints touched perpendicular segments. This effectively extracts the "gutters" of the page, that is, the white space around paragraphs and pictures. FIG. 18 illustrates the restricted and combined gutter map for the sample document of FIG. 10.

Figure 19:
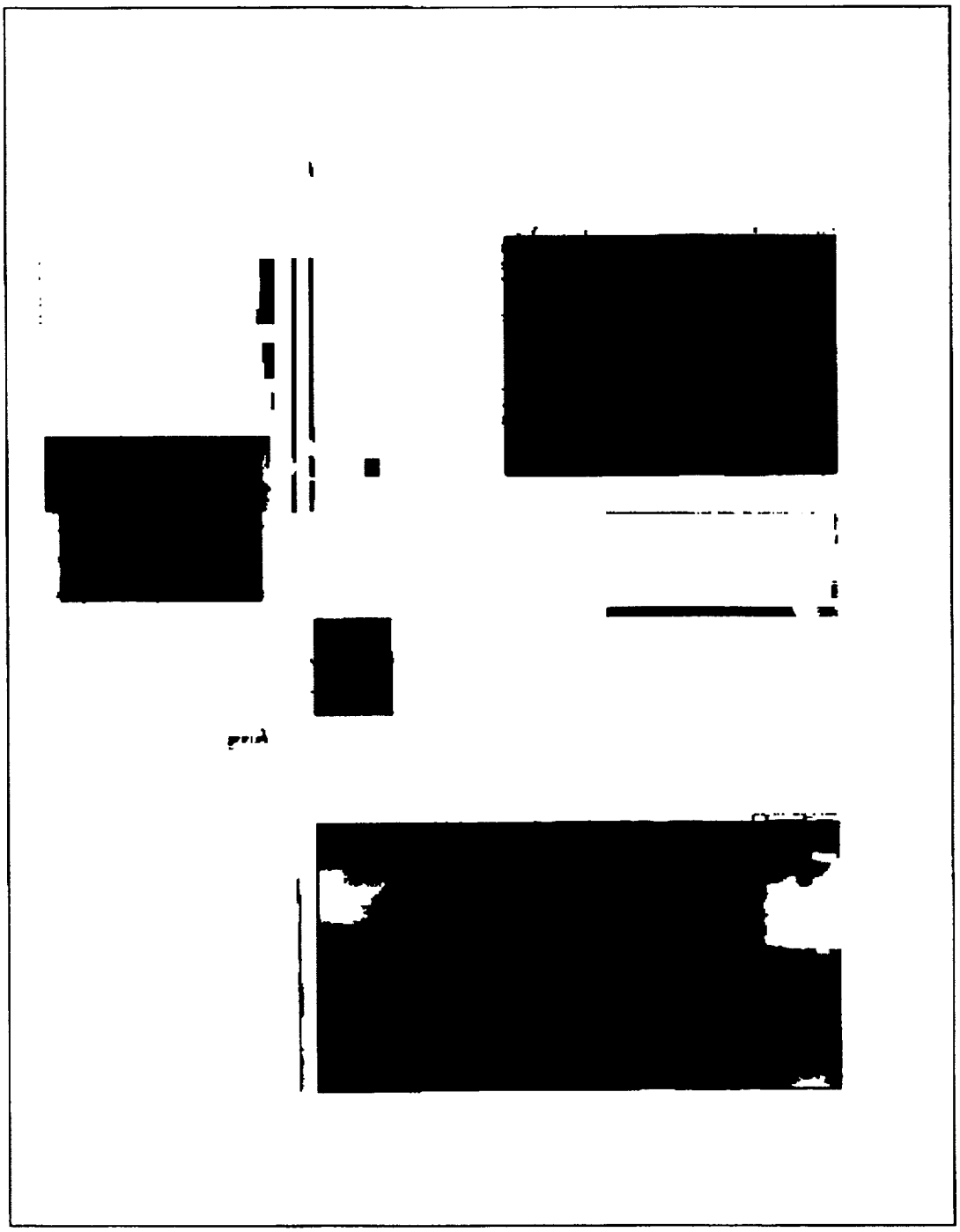
FIG. 19 is an illustration of a bitmap showing a restricted mask, with text subtracted as created while performing the image segmentation for computing the background plane in the currently preferred embodiment of the present invention.

Referring back to FIG. 9, masks in best-for-image mask using gutters found are cut out, step 908. The resulting gutters from the previous step are used to "cut out" the masks in the best-for-images bitmap. The reason that this is done is because images can have "bleed-through," which is ghost images from the back of the page. This is caused by the fact that most scanners have a shiny white background behind them, and light which was not absorbed by ink on the front of the page is passed through the page, diffused a bit, reflected off of the shiny white background, and passed through the page again. If there was ink on the back of the page, less light is sent through the page, and we get a ghost image of the back of the page. On some scanners with thin originals, the ghost can be quite pronounced. In any case, since the gutters have been extracted from the version of the image that didn't have the ghosts, we then is subtract those gutters from the version of the image that could possibly have had ghosts. The reason for doing this will become clear in the next step. FIG. 19 illustrates the best-for-image segmented masks with gutters removed for the sample document of FIG. 10.

Referring back to FIG. 9, text is cut out of the background mask, step 909. Sometimes, images are found which have text on them, such as "text-on-tint" images, where the tint is found as an image. The text mask, computed in step 903, is used to handle such cases. The text mask is dilated vertically a bit (10 pixels) to cause lines of text to merge together, and to add some "slop" above and below the text. This text is subtracted out of the image mask by computing statistics of text hole size vs. tint size. If the text hole size is a large portion of the candidate tint size, the relevant portion of the text mask is removed from the image mask. The result is illustrated in FIG. 19.

Figure 20:
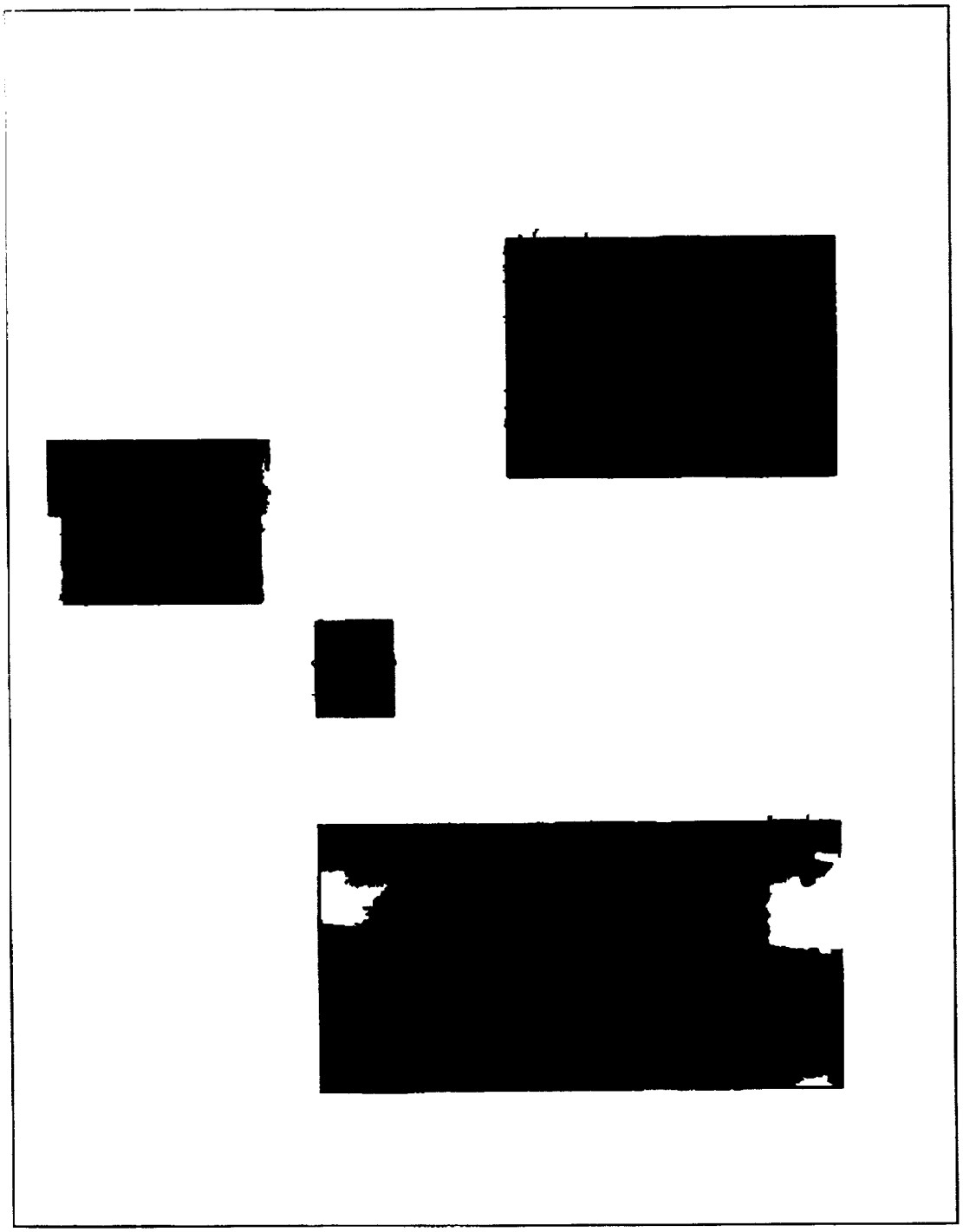
FIG. 20 is an illustration of a bitmap showing a reconstructed mask as created while performing the image segmentation for computing the background plane in the currently preferred embodiment of the present invention.

At this point two bitmaps have been computed. One contains masks corresponding to images in the best-for-text thresholding, which tend to be broken up, and usually don't contain all of the images, but just the dark portions. The other contains masks corresponding to images in the best-for-image thresholding, which tend to be fairly solid, and are only broken where the gutters are subtracted out. Our task is to preserve only the images that appeared in both bitmaps. Referring back to FIG. 9, a geodesic reconstruction or seed filling using the best for text bitmap as a seed is applied to best-for-image mask, step 910. The result is a fairly good segmentation, with the bleed-through suppressed effectively. FIG. 20 is an illustration of the resulting mask.

Figure 21:
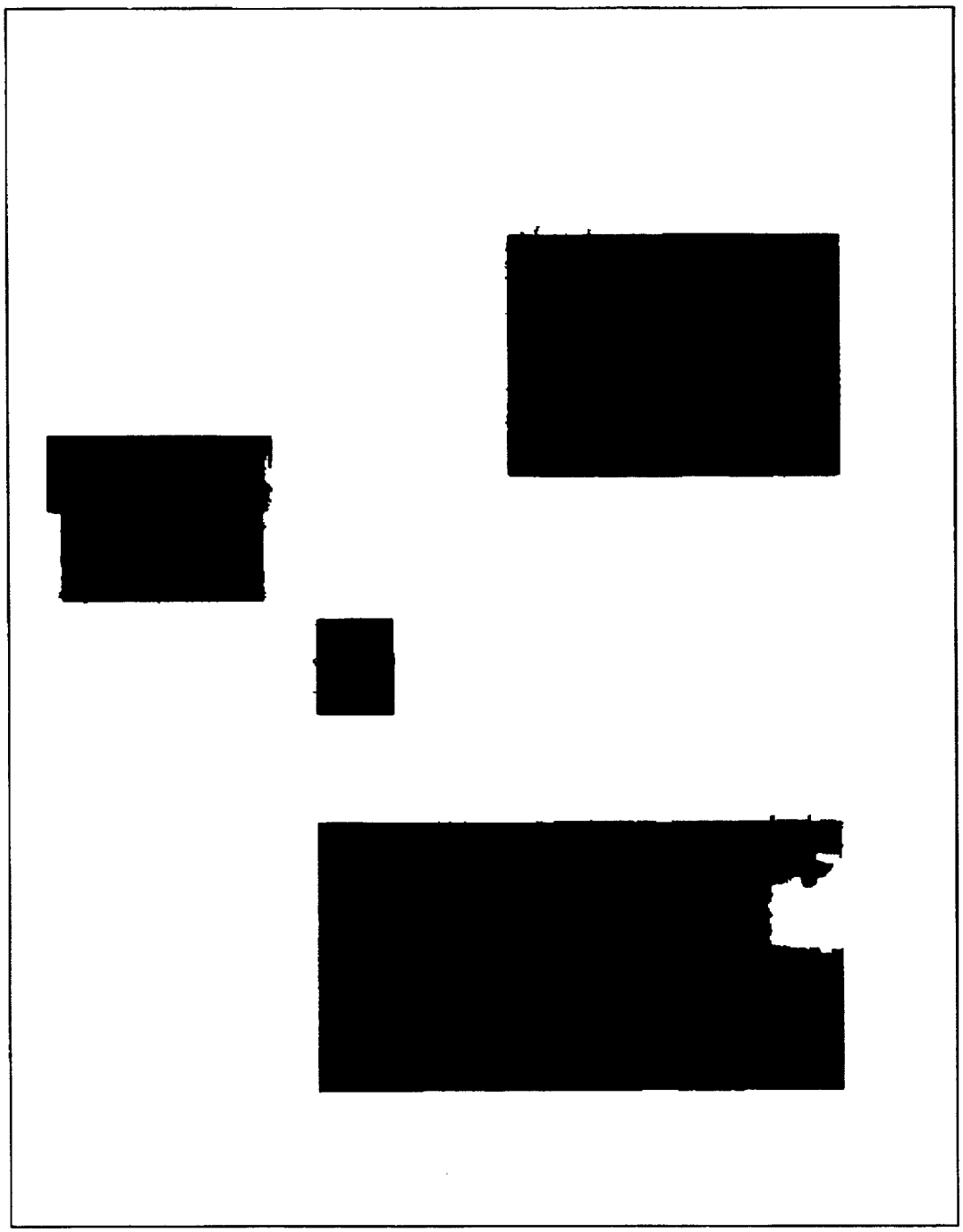
FIG. 21 is an illustration of a bitmap showing a mask with holes plugged as created while performing the image segmentation for computing the background plane in the currently preferred embodiment of the present invention.

Referring back to FIG. 9, the holes in resulting masks are plugged, step 911. The hole filling scheme of the currently preferred embodiment is as follows. Assume a binary mask as illustrated in FIG. 20. A technique of "flood filling" or "geodesic reconstruction" as is known by those of skill in the art is utilized. The mask is inverted to obtain black pixels where there was no mask. "Seed" pixels on the four edges of the inverted mask image are dropped, and a seed fill is performed which keeps flooding pixels until they run into something white. This fills all non-closed regions with black, and the white regions left are the interior parts of the mask, i.e. the "holes" which weren't filled. This is then inverted to resulting in black on only the "holes", and a union operation of those holes and the original mask is performed to get the mask with the holes filled. FIG. 21 shows the result of this hole plugging.

Figure 22:
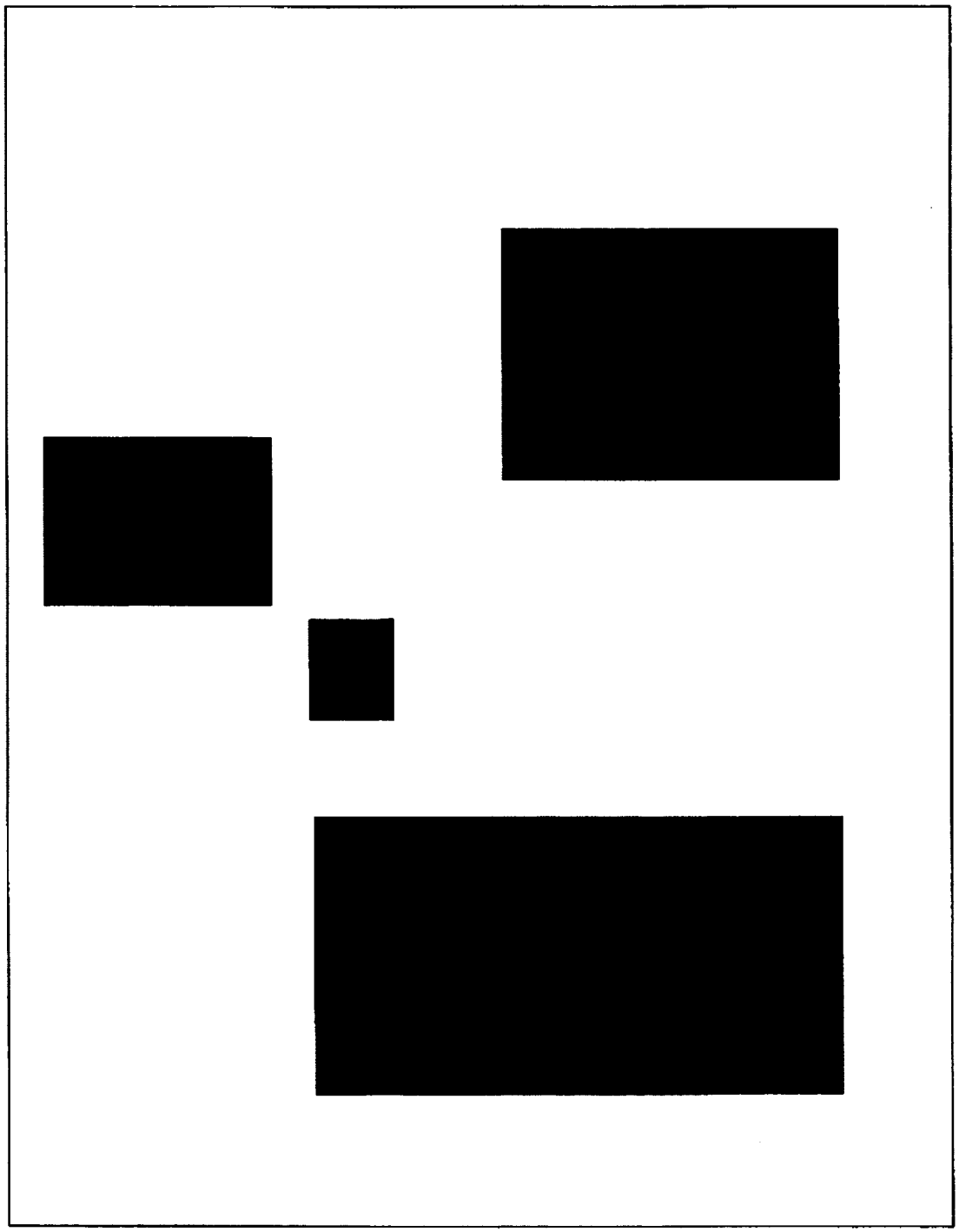
FIG. 22 is an illustration of a bitmap showing a the selector plane with the "almost-rectangles" filled in as created while performing the image segmentation for computing the background plane in the currently preferred embodiment of the present invention.

Finally, almost-rectangular mask regions are detected and made rectangular, step 912. In many cases, especially on pages with a lot of bleed-through, the background regions of photographs are almost as light as the page background, and this often results in "bays" and "inlets" in the resulting mask. These must be corrected. For each connected component in the image, a bounding rectangle for that connected component is computed. Four pieces of the bitmap are cut out, corresponding to 10% of the bounding rectangle inside the left, right, top, and bottom edges of the connected component. A vertical dilation on 10% of the top and bottom edge pieces and a horizontal dilation on 10% of the left and right edge pieces are performed, and the total number of pixels that remain are counted. This yields a statistic of how many pixels near the edge of the bounding rectangle of the connected components were black. If this number is above a threshold (85% works well), the connected component is classified as "rectangular", and the pixels in the bitmap inside the bounding box of the connected component are filled with black. FIG. 22 illustrates the mask with the rectangles made rectangular. When compared with FIG. 10, this mask clearly indicates the image areas in black. This mask is then used for identifying the images area in the box filtered reduced resolution mask, which as described above are then copied into the max-filtered reduced resolution mask which thus creates the background plane.

Data Structures

Figure 23:
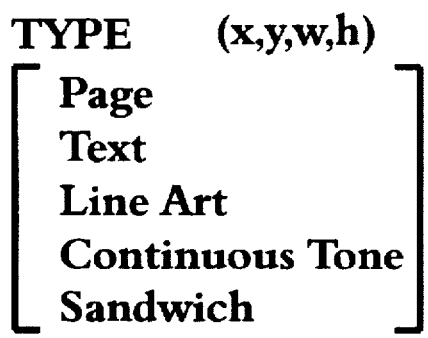
FIG. 23 is an illustration of a container data structure for storing a pixel map representation of a document as utilized in the currently preferred embodiment of the present invention.

In the currently preferred embodiment, the basic data structure is referred to as a container. The data structure defined herein supports various image representation. A container has the format illustrated in FIG. 23. Referring to FIG. 23, the container has a Type specification 2301, and spatial indicators 102. In the currently preferred embodiment, a container may be of type Page, Text, Line Art, Continuous Tone, or Sandwich. Each of the container types of Text, Line Art, Continuous Tone and Sandwich also has a corresponding pixel map(s) which is typically in a compressed form. As will be described in greater detail below, the container type of Sandwich is used to hold the compressed representation of the present invention. The spatial indicators 2302 have position information x,y for indicating where on a page the corresponding pixel map is positioned and size information w,h for indicating the dimensions of the pixel map. Each of the position information and size information is expressed in mica units. Micas are a commonly used unit known in the art of image processing wherein 1 mica is equivalent to 1/2540th of an inch.

The container further has a child pointer 2303 for pointing to a "child" container, a sibling pointer 2304 for pointing to a "sibling container" and a mask pointer 2305 for pointing to a mask. In the currently preferred embodiment, a mask is used to indicate which portions of the pixel map are displayed or otherwise used. Finally, the container has a bitmap pointer 2306 for pointing to one or more pixel maps.

Figure 24A:
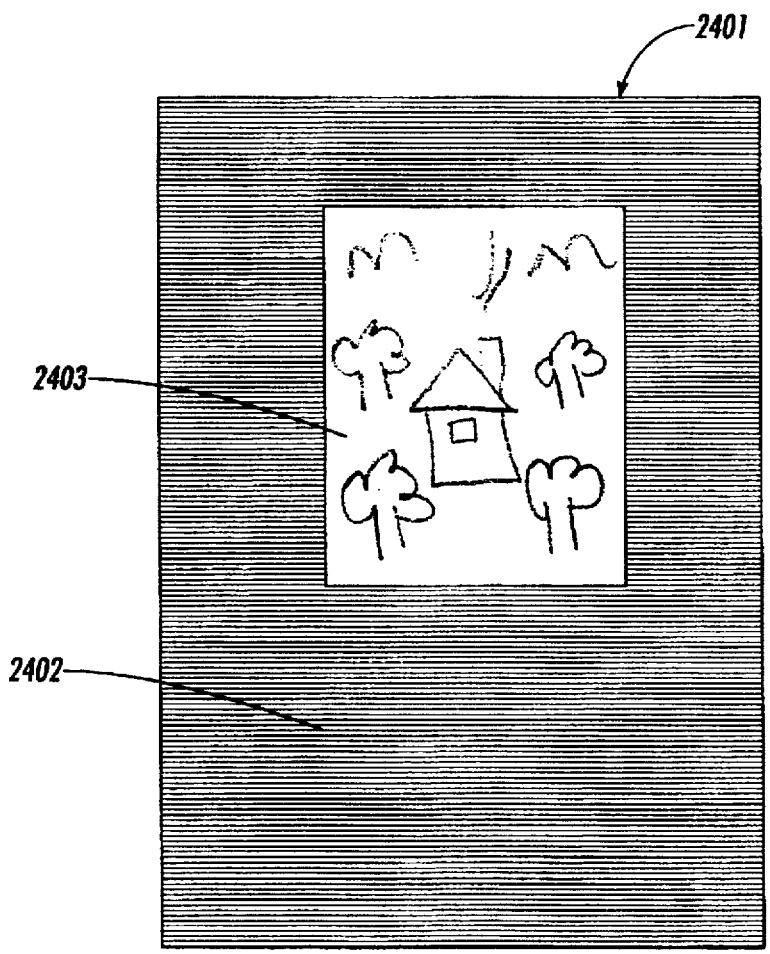
FIGS. 24a–24c illustrate a document and corresponding container structure representations for the document as may be utilized in the currently preferred embodiment of the present invention.
Figure 24B:
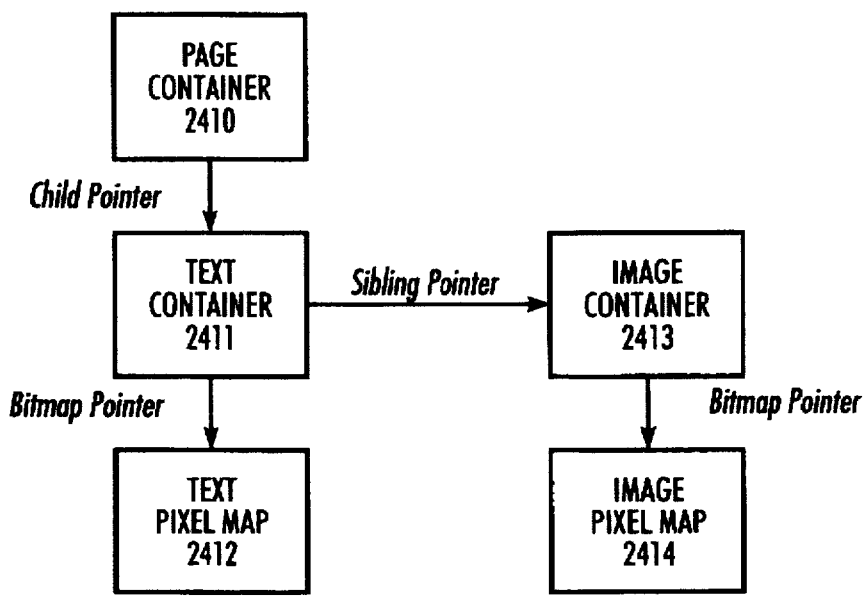
Figure 24C:
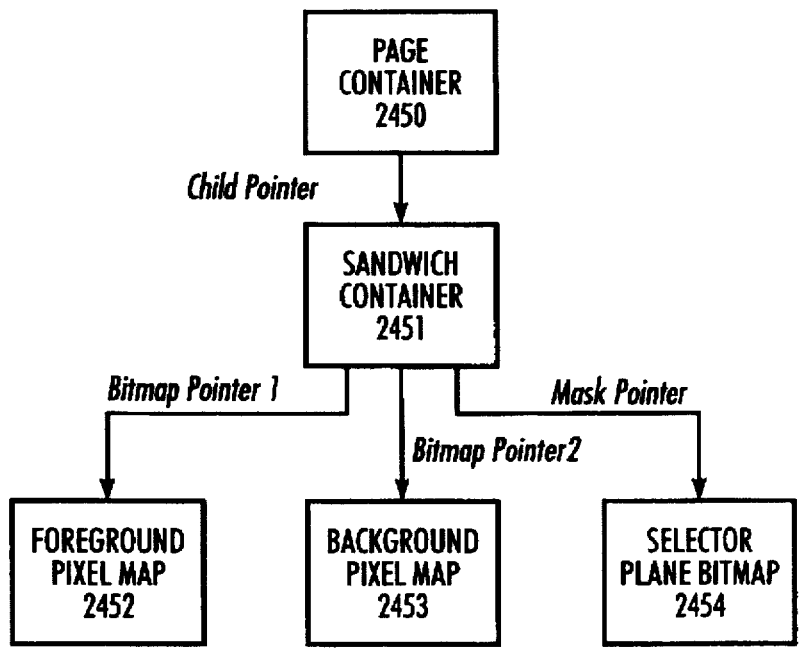

FIGS. 24a–24c illustrate a page and a corresponding data structure. Referring to FIG. 24a, the page 2401 has a text portion 2402 and an image portion 2403. A first corresponding data structure portions is illustrated in FIG. 24b. In this data structure, each of the text portions and image portion are represented by separate containers. Referring to FIG. 24b, a container 2410 of type page represents the page 2401. A child pointer 2411 of container 2410 points to a container 2412 which represents the image portion of the page. A sibling pointer of container 2412 points to a container 2413 which represents the text portion of the page. Each of the containers 2412 and 2413 subsequently points to the corresponding pixel maps for the respective image and text portions.

FIG. 24c illustrates a second corresponding data structure for the page of FIG. 24a. It is this second corresponding data structure which is used to store the format of the compressed document representation of the currently preferred embodiment of the present invention. Referring to FIG. 24c, a page container 2450 has a child pointer to a container 2451 of type sandwich. A first bitmap pointer points to the foreground plane pixel map 2452, a second bitmap pointer points to the background pixel map 2453, and the mask pointer points to the selector plane 2454.

Decompression Method

Figure 25A:
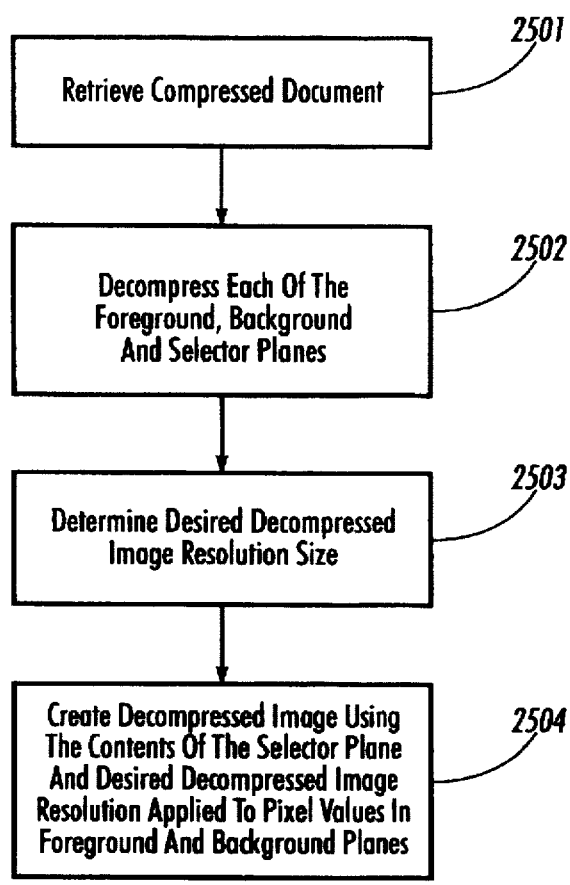
FIGS. 25a–25b are flowcharts illustrating the steps for decompressing an image as may be performed in the currently preferred embodiment of the present invention.

Decompression of a compressed document is a relatively straightforward operation. In the currently preferred embodiment, the decompression need not be to the resolution of the original pixel map. The basic steps for decompression are described in the flowchart of FIG. 25a. Referring to FIG. 25a, first the compressed document is retrieved, step 2501. Next, each of the foreground plane, the background plane and the selector plane are decompressed, step 2502. The desired decompressed image resolution size is then determined, step 2503. As noted above, the decompressed image resolution size need not be the same as the resolution of the original pixel map. The decompressed image is then created using the contents of the selector plane to determine the ultimate pixel value between the corresponding pixels in the foreground plane and the background plane, step 2504. A simple decompression technique, and one that is certainly within the spirit and scope of the present invention, would be to scale is the resolution of each pixel map (foreground, background, selector) to the desired decompressed image resolution, and then use the selector plane to switch between the foreground and background images.

However, it has been determined that at low resolutions, this can result in aliasing artifacts. It may be desirable to create an output at a lower resolution when the document image is displayed on a computer based display system.

Figure 25B:
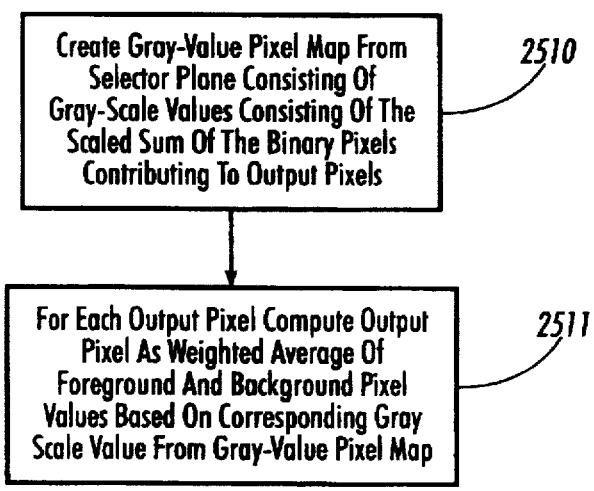

FIG. 25b describes the steps for creating the output pixel value. First, a gray-value pixel map is created, step 2510. In the currently preferred embodiment a scale-to-gray operation (a well-known operation in image processing) is performed to create the gray-value pixel map wherein gray-scale values are computed consisting of a scaled sum of the binary pixels contributing to the output pixel. In the currently preferred embodiment, a "box" filter is used to compute the gray-value pixel map. The gray-value pixel map is used to compute the output pixel as a weighted average of the foreground and background pixel values corresponding to the gray-valued pixel, step 2511. For example, for a 4 to 1 reduction in resolution, the scale-to-gray values range from 0 to 15 and output pixel values would be determined by (foreground*grayValue+ background * (16−grayValue))/16. It has been determined that this gives a nice smooth result at lower resolution, while preserving the text and background colors.

Figure 26:
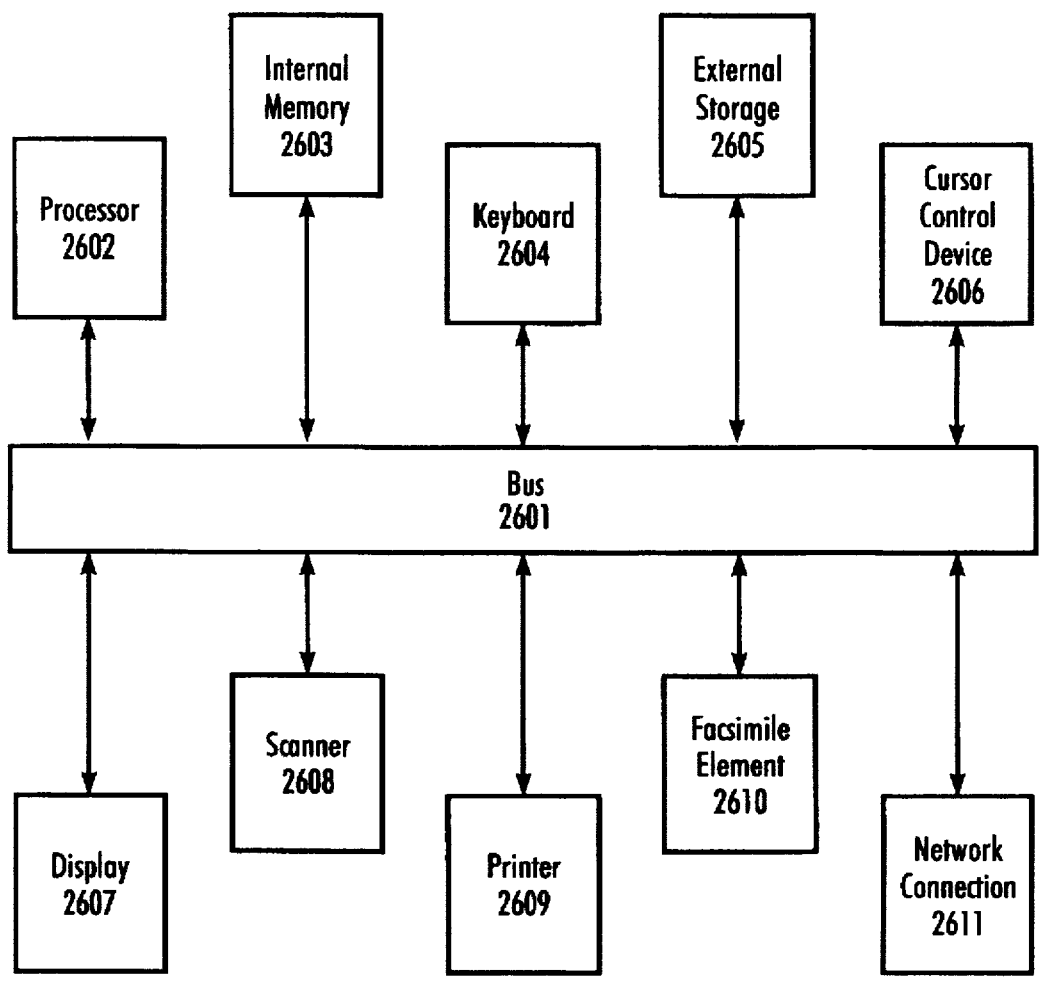
FIG. 26 is a block diagram of a computer based image processing system upon which the present invention may be implemented.

Overview of a Computer Based System In the Currently Preferred Embodiment of the Present Invention The computer based system on which the currently preferred embodiment of the present invention may be used is described with reference to FIG. 26. Referring to FIG. 26, the computer based system is comprised of a plurality of components coupled via a bus 2601. The bus 2601 illustrated here is simplified in order not to obscure the present invention. The bus 2601 may consist of a plurality of parallel buses (e.g. address, data and status buses) as well as a hierarchy of buses (e.g. a processor bus, a local bus and an I/O bus). In any event, the computer system is further comprised of a processor 2602 for executing instructions provided via bus 2601 from Internal memory 2603 (note that the Internal memory 2603 is typically a combination of Random Access or Read Only Memories). Such instructions are those that are preferably implemented in software for carrying out the processing steps outlined above in the flowcharts of FIGS. 1, 6–9 and 25. The processor 2602 and Internal memory 2603 may be discrete components or a single integrated device such as an Application Specification Integrated Circuit (ASIC) chip. Further the combination of processor 2602 and Internal Memory 2603 comprise circuitry for performing the functionality of the present invention.

Also coupled to the bus 2601 are a keyboard 2604 for entering alphanumeric input, external storage 2605 for storing data such as a compressed text image data file, a cursor control device 2606 for manipulating a cursor, and a display 2607 for displaying visual output. The keyboard 2604 would typically be a standard QWERTY keyboard but may also be a telephone like keypad. The external storage 2605 may be fixed or removable magnetic or is optical disk drive. The cursor control device 2606 will typically have a button or switch associated with it to which the performance of certain functions can be programmed. Further coupled to the bus 2601 is a scanner 2608. The scanner 2608 provides a means for creating a bitmapped representation of a medium (i.e. a scanned document image).

Further elements that could typically be coupled to the bus 2601 would include printer 2609, facsimile element 2610 and network connection 2611. The printer 2609 could be used to print the bitmapped representation. The facsimile element 2610 may contain an element used to transmit a image data that has been compressed using the present invention. Alternatively, the facsimile element 2610 could include an element for decompression of a document image compressed using the present invention. The network connection 2611 would be used to receive and/or transmit data containing image data. Thus, the image data utilized by the present invention may be obtained through a scanning process, via a received fax or over a network.

Thus, a method and apparatus for compressing scanned color or gray scale image documents is disclosed. While the present invention is described with respect to a preferred embodiment, it would be apparent to one skilled in the art to practice the present invention with other alternative embodiments. Such alternate embodiments would not cause departure from the spirit and scope of the present invention

What is claimed is:

1. A method for compressing a pixel map representation of a document, said pixel map representation having a resolution of X spots per inch, said method comprising the steps of:

a) creating a foreground pixel map from said pixel map representation of a document, said foreground pixel map having a resolution less than X spots per inch and containing color information for foreground elements of said document;

b) creating a background pixel map from said pixel map representation of a document, said background pixel map having a resolution less than X spots per inch and containing image information for image portions and color information for non-foreground portions of said document;

c) creating a selector map from said pixel map representation of a document, said selector map for selecting between pixels in said foreground pixel map and said background pixel map when decompressing said compressed pixel map representation of said document;

d) compressing and storing each of said foreground pixel map and said background pixel map using a compression technique suitable for compressing images; and e) compressing said selector map using a technique suitable for compressing bitmaps.

2. The method as recited in claim 1 wherein said step of creating a foreground pixel map from said pixel map representation of a document is further comprised of the steps of:

a1) creating a thresholded bitmap from said pixel map representation of a document, said thresholded bitmap having a resolution greater than X spots per inch and each location in said bitmap indicating if a corresponding location in said pixel map representation of a document exceeds a predetermined and corresponding threshold value;

a2) thinning said thresholded bitmap;

a3) finding connected components in said thresholded bitmap a4) determining a color for said connected components in said thresholded based on the color values in said at corresponding locations in said pixel map representation of a document;

a5) placing said determined color in said foreground pixel map at corresponding locations of said connected component in said thresholded bitmap; and a6) for locations in said thresholded bitmap that are not part of a connected component, placing an existing color that is closest to that location.

3. The method as recited in claim 2 wherein said step of creating a thresholded bitmap from said pixel map representation of a document is further comprised of the steps of:

a1) creating a reduced resolution threshold map for said pixel map representation of a document, said reduced resolution threshold map providing threshold values for locations in said pixel map representation of a document; and a2) for each location in said thresholded bitmap, applying values in said reduced resolution threshold map to corresponding locations of said pixel map representation and placing therein an indicator of whether the corresponding pixel value exceeds said threshold value.

4. The method as recited in claim 3 wherein said step of creating a reduced resolution threshold map for said pixel map representation of a document is further comprised of the steps of:

creating a gradient pixel map from said pixel map representation of a document;

thresholding said gradient pixel map using a predefined threshold value based on said resolution X;

finding the connected components in the thresholded gradient pixel map;

for each connected component performing the substeps of:

determining a local threshold value for said connected component; and placing said local threshold value at each pixel location for said connected component;

for locations in said thresholded gradient pixel map not part of a connected component, placing an existing threshold value that is closest.

5. The method as recited in claim 1 wherein said step of creating a selector plane is further comprised of the steps of:

identifying text in said pixel map representation of a document;

placing a first binary value in said selector plane indicating using pixel values from said foreground pixel map at corresponding locations containing text; and placing a second binary value in said selector plane indicating using pixel values from said background pixel map at corresponding locations that are not identified as containing text.

6. The method as recited in claim 5 wherein said step of identifying text in said pixel map representation of a document is further comprised of the step of segmenting images portions of said bitmap representation from text portions of said pixel map representation of a document using a best for text segmentation technique.

7. The method as recited in claim 1 wherein said step of creating a background pixel map from said pixel map representation of a document is further comprised of the steps of:

b1) creating a max reduced resolution pixel map from said pixel map representation of a document, said max reduced resolution pixel map for preserving image portions of said pixel map representation of a document for preserving background information of said pixel map representation of a document;

b2) creating a box filtered reduced resolution pixel map from said pixel map representation of a document, said box filtered reduced resolution pixel map for preserving image portions of said pixel map representation of a document;

b3) segmenting said pixel map representation of a document to create a segmentation map so that image portions of said segmentation map have a first binary value;

b4) modifying said max reduced resolution pixel map by copying pixel values from said box filtered reduced resolution pixel map onto said max reduced resolution pixel map at locations corresponding to locations of said segmentation having said first binary value; and b5) providing said modified max reduced resolution pixel map as said background map.

8. The method as recited in claim 7 wherein said step of segmenting said pixel map representation of a document to create a segmentation map so that image portions of said segmentation map have a first binary value is further comprised of the steps of:

reducing the resolution of said pixel map to approximately 100 spots per inch;

thresholding said reduced pixel map utilizing a best for text technique to create a text thresholded bitmap;

computing a text map from said text thresholded bit map, said text map having said first binary value at locations having text and said second binary value at locations not having text;

thresholding said reduced pixel map utilizing a best for image technique to create an image thresholded bitmap;

computing a best for text mask from said reduced resolution pixel map using said text thresholded bitmap, said best for text mask having said first binary value at locations having text;

computing a best for image mask from said reduced resolution pixel map using said image thresholded bitmap, said best for image mask having said first binary value at locations having image information;

locating horizontal and vertical gutters in said best for text mask, said horizontal and vertical gutters indicating areas where there is neither text or image information;

removing gutters in said best for text mask that do not intersect orthogonally with another gutter at their endpoints;

cutting out areas of said best for image mask using the remaining gutters in said best for text mask;

cutting text out of said best for image mask using said text mask;

applying a geodesic reconstruction to said best for image mask using said best for text bitmap as a seed to fill out image areas in said best for image mask;

identifying and plugging holes in said best for image mask;

creating rectangular mask regions from regions that are almost rectangular; and providing said best for image mask as said segmentation map.

9. The method as recited in claim 1 wherein said compression technique suitable compressing images is a JPEG technique.

10. The methods as recited in claim 1 wherein said compression technique suitable for compressing bitmaps is a symbol based pattern matching technique.

11. A system for processing with pixel map representations of documents comprising:

input means for receiving a pixel map representation of a document; and compression means for compressing said pixel map representation of a document, said compression means comprising:

decomposing means for decomposing said pixel map representation of a document into a foreground pixel map containing color information for foreground elements of said document, a background pixel map containing image information for image portions and color information for non-text portions of said document, and a selector map for selecting between said foreground pixel map and said background pixel map; and means for applying a suitable compression technique to each of said foreground pixel map, background pixel map and said selector map.

12. The system as recited in claim 11 wherein said decomposing means is further comprised of:

means for reducing the resolution of said pixel map representation of a document;

means for thresholding a pixel map to created a corresponding thresholded bitmap; and means for creating said foreground pixel map from a thresholded bitmap and a reduced resolution representation of said pixel map.

13. The system as recited in claim 12 wherein said decomposing means is further comprised of:

means for creating said background pixel map comprising:

box filtering means for performing a box filter operation on a pixel map;

max filtering means for performing a max filter operation on a pixel map;

first image segmentation means for creating an image mask identifying image portions on a pixel map;

combining means for combining a box filtered pixel map with a max filtered pixel map based on said image mask to create said background pixel map.

14. The system as recited in claim 13 wherein said decomposing means is further comprised of second image segmentation means for segmenting said pixel map representation of a document using a best for text segmentation technique, said first image segmentation means for creating said selector map.

15. The system as recited in claim 11 further comprising decompression means for decompressing a compressed representation of a pixel map representation of a document, said decompression means further comprised of:

means for determining an output resolution is less than to an original resolution of said pixel map representation of a document;

means for decompressing based on pixel values determined by said selector plane selecting between pixel values of said foreground pixel map and said background pixel map if said output resolution is equal to said original resolution;

means for decompressing based on synthesized and weighted pixel values determined by said selector plane and selecting between pixel values of said foreground pixel map and said background pixel map if said output resolution is less than said original resolution.

16. The system as recited in claim 15 wherein said means for decompressing based on synthesized and weighted pixel values determined by said selector plane and selecting between pixel values of said foreground pixel map and said background pixel map if said output resolution is less than said original resolution is further comprised of:

means for generating a gray value map from said selector plane based on said output resolution, said gray value map indicating a scaled sum of the pixel values contributing to an output pixel value;

means for generating an output pixel value based on a foreground pixel value, a background pixel value, a corresponding gray value obtained from said gray value map and said output resolution.

17. A program storage device readable by a machine, tangibly embodying a program of instructions executable by the machine to perform method steps for compressing a document image, said method steps comprising:

a) receiving a pixel map representation of a document;

b) creating a thresholded bitmap from said pixel map representation of a document, said thresholded bitmap having a resolution greater than X spots per inch;

c) creating a foreground pixel map from said thresholded bitmap, said foreground pixel map having a resolution less than X spots per inch and containing color information for foreground elements of said document;

d) creating a background pixel map from said pixel map representation of a document, said background pixel map having a resolution less than X spots per inch and containing image information for image portions and color information for non-text portions of said document;

e) creating a selector map from said pixel map representation of a document, said selector map for selecting between pixels in said foreground pixel map and said background pixel map when decompressing said compressed pixel map representation of said document;

f) compressing and storing each of said foreground pixel map and said background pixel map using a compression technique suitable for compressing images; and g) compressing said selector map using a pattern matching compression technique.

18. The article of manufacture as recited in claim 17 further tangibly embodying instructions for a method for decompressing a compressed document image, said decompressing method comprising the steps of:

h) decompressing each of said foreground pixel map, background pixel map and said selector map;

i) determining a decompressed resolution;

j) if said decompressed resolution is greater than or equal to X, creating said decompressed pixel map by using said selector map to choose between pixel values in said foreground pixel map and pixel values in said background pixel map for said decompressed bitmap; and k) if said decompressed resolution is less than X, scaling the decompressed pixel values based on the contribution of corresponding pixel values from said foreground pixel map and said background pixel map.

19. A method for decompressing a compressed document image comprising the steps of:

a) receiving a compressed document image representation having an original resolution X, said compressed document image representation comprising a compressed foreground pixel map containing color information for foreground elements of said document, a compressed background pixel map containing image information for image portions and color information for non-text portions of said document, and a compressed selector map for selecting between said foreground pixel map and said background pixel map;

b) decompressing each of said compressed foreground pixel map, compressed background pixel map and said compressed selector map;

c) determining a decompression resolution;

d) if said decompression resolution is greater than or equal to X, creating said decompressed pixel map by using said selector map to choose between pixel values in said foreground pixel map and pixel values in said background pixel map for said decompressed bitmap; and e) if said decompressed resolution is less than X, scaling the decompressed pixel values based on the contribution of corresponding pixel values from said foreground pixel map and said background pixel map.

20. The method as recited in claim 19 wherein said step of scaling the decompressed pixel values based on the contribution of corresponding pixel values from said foreground pixel map and said background pixel map is further comprised of the steps of:

generating a gray value map from said selector plane based on said decompression resolution, said gray value map indicating a scaled sum of the pixel values contributing to an output pixel value;

generating an output pixel value based on a foreground pixel value, a background pixel value, a corresponding gray value obtained from said gray value map and said decompression resolution.

\* \* \* \* \*